US012586730B2

(12) United States Patent
Kropiewnicki, Jr. et al.

(10) Patent No.: US 12,586,730 B2
(45) Date of Patent: Mar. 24, 2026

(54) CAPACITOR ASSEMBLY WITH LAMINAR BUS PLATE ARRANGEMENT

(71) Applicant: Cornell Dubilier, LLC, Itasca, IL (US)

(72) Inventors: Robert A. Kropiewnicki, Jr., Liberty, SC (US); Ralph M. Kerrigan, Jupiter, FL (US); Samuel G. Parler, Jr., Clemson, SC (US)

(73) Assignee: CORNELL DUBILIER, LLC, Itasca, IL (US)

( * ) Notice: Subject to any disclaimer, the term of this patent is extended or adjusted under 35 U.S.C. 154(b) by 335 days.

(21) Appl. No.: 18/134,220

(22) Filed: Apr. 13, 2023

(65) Prior Publication Data

US 2023/0352246 A1 Nov. 2, 2023

Related U.S. Application Data

(60) Provisional application No. 63/335,307, filed on Apr. 27, 2022.

(51) Int. Cl.
*H01G 4/32* (2006.01)
*H01G 2/08* (2006.01)
(Continued)

(52) U.S. Cl.
CPC ................. *H01G 4/32* (2013.01); *H01G 2/08* (2013.01); *H01G 4/224* (2013.01); *H01G 4/232* (2013.01); *H01G 4/38* (2013.01)

(58) Field of Classification Search
None
See application file for complete search history.

(56) References Cited

U.S. PATENT DOCUMENTS

| | | | |
|---|---|---|---|
| 5,493,471 A * | 2/1996 | Walther | H01G 4/38 |
| | | | 361/328 |
| 6,278,603 B1 * | 8/2001 | Arbanas | H01G 2/04 |
| | | | 361/535 |

(Continued)

FOREIGN PATENT DOCUMENTS

| | | |
|---|---|---|
| CN | 108597873 A | 9/2018 |
| DE | 102014110053 A1 | 5/2015 |

(Continued)

OTHER PUBLICATIONS

Translation DE 102014110053A1 (no date).*
(Continued)

*Primary Examiner* — Eric W Thomas
(74) *Attorney, Agent, or Firm* — Hickman Becker Bingham Ledesma LLP; Matthew Loppnow

(57) ABSTRACT

A capacitor assembly includes a laminar bus plate arrangement having at least one first polarity bus plate and at least one second polarity bus plate separated by a sheet-like insulator. At least one pair of bus terminals have a first polarity bus terminal electrically connected to the first polarity bus plate and a second polarity bus terminal electrically connected to the second polarity bus plate. A plurality of wound film capacitor elements each have a first end surface and a second end surface defining a proximal first polarity terminal and a distal second polarity terminal, respectively. An elongate conductor extends along an axis of the respective capacitor elements, the elongate conductor providing electrical communication between the second polarity terminal of the respective capacitor element and the second polarity bus plate. The first polarity terminal of each of the capacitor elements is electrically connected to the first polarity bus plate.

37 Claims, 21 Drawing Sheets

(51) Int. Cl.
*H01G 4/224* (2006.01)
*H01G 4/232* (2006.01)
*H01G 4/38* (2006.01)

(56) References Cited

U.S. PATENT DOCUMENTS

| | | | |
|---|---|---|---|
| 2009/0059467 A1 | 3/2009 | Grimm |
| 2011/0149472 A1 | 6/2011 | Yang |
| 2011/0304948 A1 | 12/2011 | Lee |
| 2020/0328032 A1 | 10/2020 | Gomez |

FOREIGN PATENT DOCUMENTS

| | | | | |
|---|---|---|---|---|
| DE | 202018106621 U1 * | 4/2019 | ............... | H01G 2/02 |
| EP | 3477669 A1 | 5/2019 | | |
| JP | 2013084787 A * | 5/2013 | | |

OTHER PUBLICATIONS

El-Sayed, International Search Report, International Application No. PCT/US2023/018918, European Patent Office, Rijswijk, NL Dec. 7, 2023.

* cited by examiner

CAPACITOR ASSEMBLY WITH LAMINAR BUS PLATE ARRANGEMENT

PRIORITY CLAIM

This application is based upon and claims the benefit of U.S. provisional application Ser. No. 63/335,307, filed Apr. 27, 2022, which is incorporated herein in its entirety for all purposes.

FIELD OF THE INVENTION

Embodiments of the present invention relate to capacitor assemblies having a plurality of capacitor elements. More particularly, embodiments of present invention relate to such a capacitor assembly that exhibits smooth and well-behaved impedance with mitigation of bus resonances.

BACKGROUND OF THE INVENTION

It is often desirable to reduce the ESR (equivalent series resistance) of a capacitor assembly formed of multiple capacitor elements fed by a bus structure. For example, the usual approach to layout of a capacitive bus structure in high frequency applications is to bring the terminals to connect with low impedance to two parallel conductor plates separated by a thin dielectric. To handle the highest power and highest AC current at high frequencies, the capacitor elements are conventionally designed with low ESR and are each connected to the common, main plates in a manner that has as low of a series inductance as possible.

According to one example of the conventional approach, each element may be connected with wide tabs that enclose minimal area. According to another example of the conventional approach, each element may be connected with one terminal directly to one of the main foils and the other terminal connected by an enclosing foil shroud around the rest of the element, contacting the other main foil.

Another conventional strategy for bus layout is to arrange low-capacitance elements nearest the terminals of the structure, where the main AC current enters the bus structure, and to locate the high-capacitance elements further away. The goal of such an arrangement is to present to the input terminals a sequential range of impedances versus frequency.

While these conventional strategies have proved generally effective in some applications, other applications present special challenges that make the conventional strategies less effective. For example, high capacitance, high frequencies, and large physical volume (e.g., greater than 4 liters) required in some applications exacerbate bus resonances. In addition, high ripple currents (e.g., hundreds of amps extending to about 1 MHz) complicates thermal management. In this regard, operation at temperatures above a threshold can result in premature failure of the overall capacitor assembly. In addition, the high current requirements of these capacitors may necessitate the use of multiple pairs of terminals which complicates the achievement of uniform current density.

SUMMARY OF THE INVENTION

The present invention recognizes and addresses the foregoing considerations, and others, of prior art constructions and methods.

One aspect of the present invention provides a capacitor assembly comprising a laminar bus plate arrangement having at least one first polarity bus plate and at least one second polarity bus plate separated by a sheet-like insulator. At least one pair of bus terminals has a first polarity bus terminal electrically connected to the first polarity bus plate and a second polarity bus terminal electrically connected to the second polarity bus plate. A plurality of wound film capacitor elements are also provided, each having a first end surface and a second end surface defining a proximal first polarity terminal and a distal second polarity terminal, respectively. The assembly further includes an elongate conductor extending along an axis of each of the capacitor elements, the elongate conductor providing electrical communication between the second polarity terminal of the respective capacitor element and the second polarity bus plate. The first polarity terminal of each of the capacitor elements is electrically connected to the first polarity bus plate.

In some exemplary embodiments, the first polarity terminal of each of the capacitor elements is proximal to and makes electrical connection with the first polarity bus plate. Additionally, each of the elongate conductors may comprise a conductive thru-rod with a respective coaxial insulator being located about at least a portion of the conductive thru-rod. Embodiments are contemplated in which the conductive thru-rod extends through an aperture in the first polarity bus plate for connection to the second polarity bus plate.

In some exemplary embodiments, a first cooling plate is in thermally conductive relationship with but orthogonal to the second polarity bus plate. For example, the first cooling plate may comprise a portion of an ell integral with the second polarity bus plate. A base plate in thermally conductive but electrically insulative relationship with the first cooling plate may also be provided. Embodiments are also contemplated in which second and third cooling plates are in thermally conductive relationship with the first polarity bus terminal and the second polarity bus terminal, respectively. A base plate may be in thermally conductive but electrically insulative relationship with the first cooling plate, the second cooling plate, and the third cooling plate. In some exemplary embodiments, at least one thermal shield at least partially surrounds at least some of the capacitor elements. The thermal shield may be in thermally conductive relationship with at least one of the first cooling plate, the second cooling plate, and the third cooling plate. For example, the thermal shield may have a multi-sided box-like structure.

In some exemplary embodiments, the laminar bus plate arrangement comprises two of the first polarity bus plates respectively separated from the at least one second polarity bus plate by respective sheet-like insulators. In addition, the at least one second polarity bus plate may comprise a pair of second polarity bus plates juxtaposed to and in electrical communication with one another. Moreover, a first number of capacitor elements may be mounted to a first side of the laminar bus plate arrangement and a second number of capacitor elements may be mounted to a second side of the laminar bus plate arrangement such that the first number of capacitor elements and second number of capacitor elements are back-to-back. The first and second numbers of capacitor elements may comprise an equal number of capacitor elements.

In some exemplary embodiments, the plurality of capacitor elements comprises at least 9 of the capacitor elements, at least 16 of the capacitor elements, at least 32 of the capacitor elements, or at least 48 of the capacitor elements.

In some exemplary embodiments, the laminar bus plate arrangement and the plurality of capacitor elements are at least partially encased in a potting compound.

In some exemplary embodiments, the at least one pair of bus terminals may comprise a plurality of pairs (e.g., three or more pairs) of bus terminals spaced apart from one another.

In some exemplary embodiments, the one or more pairs of bus terminals extend orthogonally from the laminar bus plate arrangement.

Another aspect of the present invention provides a capacitor assembly comprising a laminar bus plate arrangement having a multilayer structure in which a pair of outer first polarity bus plates are interposed by at least one second polarity bus plate, wherein the multilayer structure further includes first and second sheet-like insulators separating the first polarity bus plates from the at least one second polarity bus plate. At least one pair of bus terminals has a first polarity bus terminal electrically connected to the first polarity bus plates and a second polarity bus terminal electrically connected to the second polarity bus plate. A plurality of capacitor elements each having a first end surface and a second end surface defining a proximal first polarity terminal and a distal second polarity terminal, respectively, are also provided.

A first number of capacitor elements are mounted to a first side of the laminar bus plate arrangement such that the first polarity terminals thereof are electrically connected to one of the first polarity bus plates and a second number of capacitor elements are mounted to a second side of the laminar bus plate arrangement such that the first polarity terminals thereof are electrically connected to another one of the first polarity bus plates. The second polarity terminals of the capacitor elements are electrically connected to the at least one second polarity bus plate. The capacitor elements may comprise wound film capacitor elements having a generally cylindrical configuration.

In some exemplary embodiments, a base plate is provided to which the laminar bus plate arrangement is orthogonally mounted. Preferably, the laminar bus plate arrangement is in thermally conductive but electrically insulative relationship with the base plate.

Another aspect of the present invention provides a capacitor assembly comprising a laminar bus plate arrangement having at least one first polarity bus plate and at least one second polarity bus plate separated by a sheet-like insulator. At least one pair of bus terminals have a first polarity bus terminal electrically connected to the first polarity bus plate and a second polarity bus terminal electrically connected to the second polarity bus plate. A plurality of wound film capacitor elements each have a first end surface and a second end surface defining a proximal first polarity terminal and a distal second polarity terminal, respectively. The first polarity terminal of each capacitor element is electrically connected to the first polarity bus plate. The second polarity terminal of each capacitor element is electrically connected to the second polarity bus plate. A base plate in thermally conductive but electrically insulative relationship with the laminar bus plate arrangement may also be provided.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
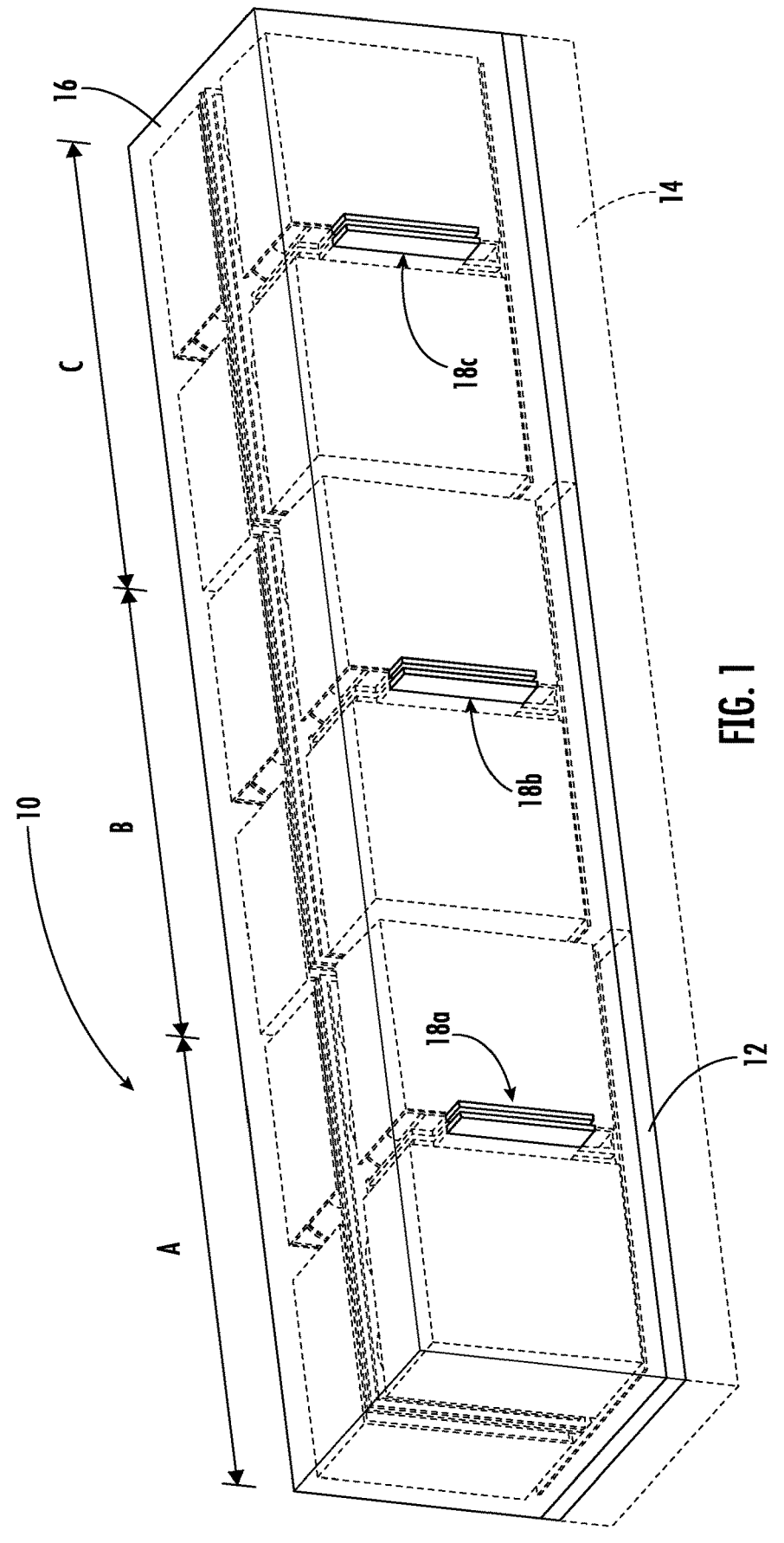
FIG. 1 is a perspective view of a capacitor assembly in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a capacitor assembly 10 constructed in accordance with an embodiment of the present invention. Assembly 10 has various internal components mounted to a thermally conductive base plate 12. For example, base plate 12 may be formed of a suitable thermally conductive metal such as aluminum or copper. In use, base plate 12 may be juxtaposed to an isothermal surface to maintain assembly 10 below a desired temperature threshold. For example, the isothermal surface may be formed as a liquid-cooled heat sink 14 that collects heat from capacitor assembly 10 and discharges it via an external heat exchanger.

The internal components of assembly 10 are preferably at least partially or fully potted in epoxy or another suitable potting compound to form a monolith 16. (One skilled in the art will appreciate that base plate 12 is left exposed for bonding to the heat sink 14.) The volume of base plate 12 and monolith 16 may often exceed two liters, such as four to six liters. In this case, current flows to and from assembly 10 via three pairs of bus terminals 18a-c that extend outside the monolith 16. As will be appreciated, each pair of bus terminals has a first terminal of one polarity (+or −) and a second terminal of the opposite polarity (− or +). Bus terminal pairs 18a-c, which distribute the current to and from assembly 10, may be spaced apart from each other by several centimeters to several inches depending on the embodiment.

In this case, assembly 10 is formed of three identical "sub-modules" A, B, and C. Each of the sub-modules (each of which may itself constitute a capacitor assembly of the present invention), has a plurality of capacitor elements mounted to a laminar bus plate arrangement described in detail below. A respective pair of bus terminals are associated with each of the sub-modules. In some embodiments, the sub-modules are merely conceptual divisions of capacitor assembly 10 (i.e., the base plate 12 and internal laminar bus plate arrangement are unitary). In the illustrated embodiment, however, the sub-modules are physically separate but combined to form the overall assembly 10.

Figure 2:
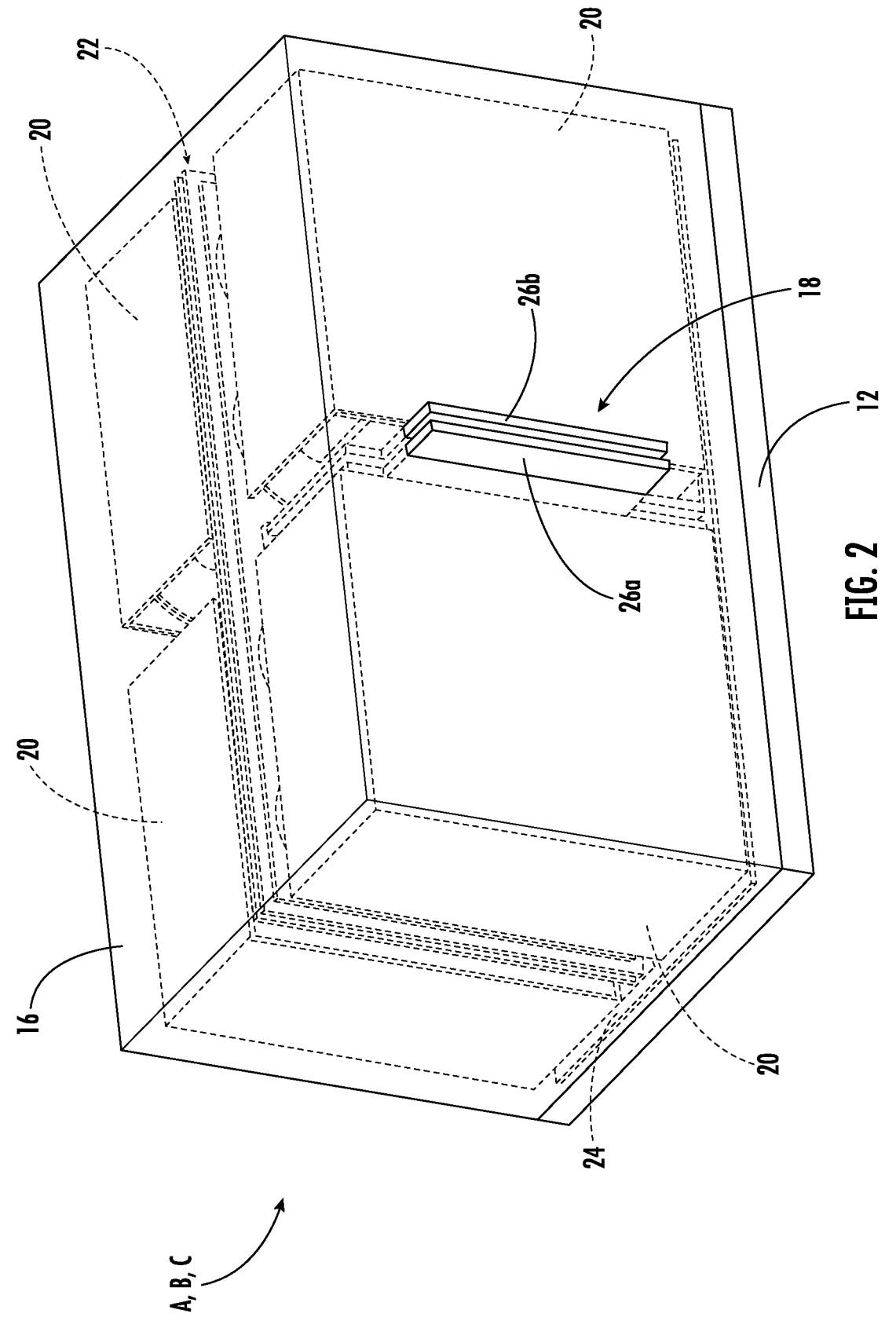
FIG. 2 is a perspective view of a sub-module of the capacitor assembly of FIG. 1.

FIG. 2 is an enlarged view of one of the sub-modules A, B, or C. In this illustration, the potting compound is shown as transparent so that certain internal details can be seen. The capacitor elements themselves are largely obscured, however, by a plurality of thermal shields 20 that will be described more fully below. The capacitor elements are mounted to a laminar bus plate arrangement 22 which is orthogonal to base plate 12 in this case. A thermally conductive but electrically insulative sheet 24 separates the metal components (e.g., the laminar bus plate arrangement 22) from base plate 12. For example, sheet 24 may be a silicone rubber/fiberglass composite sold under the commercial name Sil-Pad® or an acceptable alternative. As shown, bus terminals 18, which extend from laminar bus plate arrangement 22 to a location outside of the potting compound, include separate first and second polarity terminals 26a and 26b.

Figure 3:
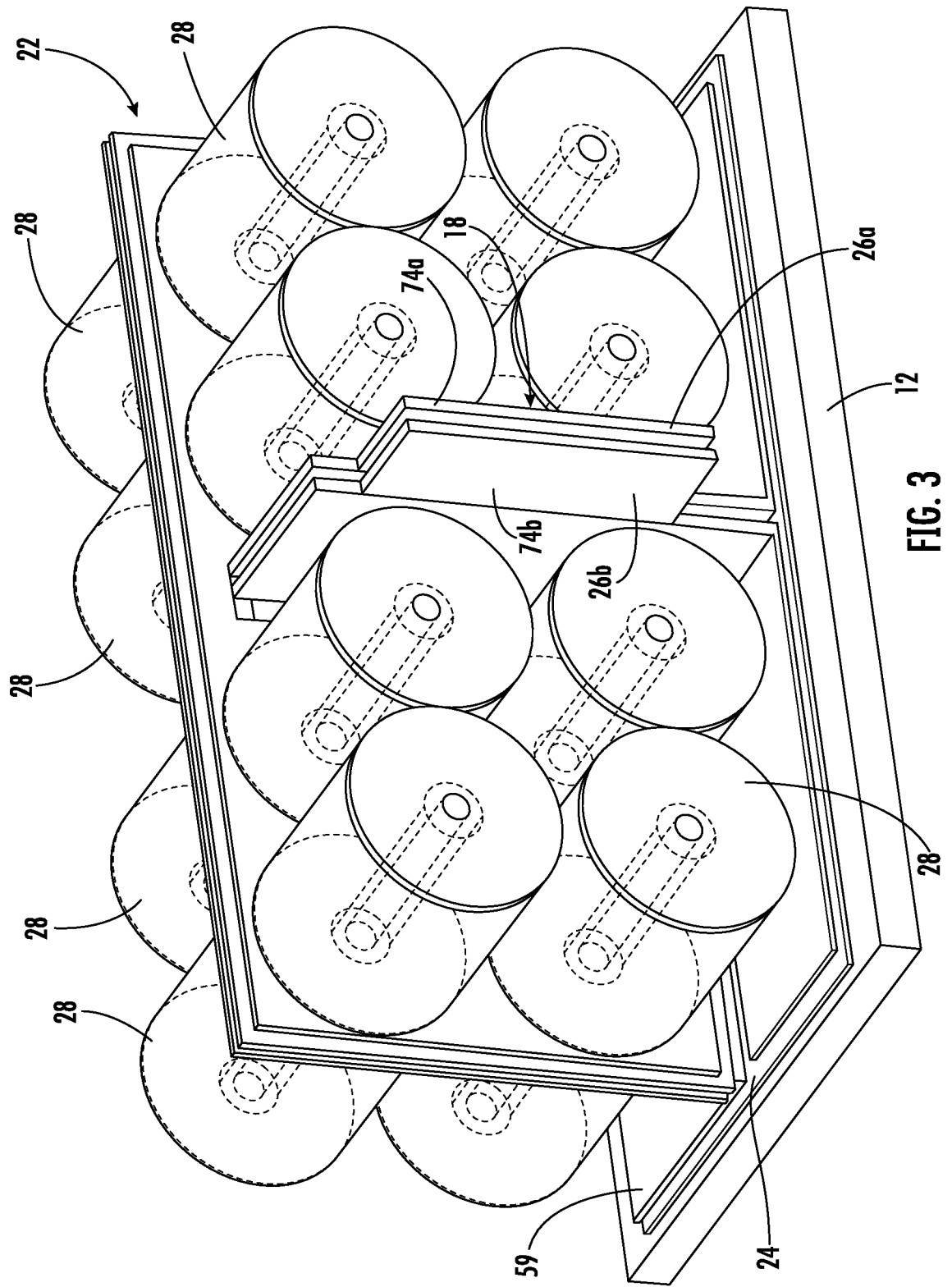
FIG. 3 is a view similar to FIG. 2 but with some parts removed to reveal details of the internal construction.

FIG. 3 illustrates an intermediate stage in the manufacture of assembly 10 without the potting compound and thermal shields 20. This sub-module has a total of sixteen capacitor elements 28 mounted to laminar bus plate arrangement 22 such that all of the capacitor elements 28 are connected in parallel. As a result, the total capacitance of the sub-module is the sum of the individual capacitor elements 28 and the total capacitance of capacitor assembly 10 is the sum of the capacitances of the sub-modules.

As can be seen, eight of the capacitor elements 28 are mounted to each side of laminar bus plate arrangement 22 in back-to-back relationship. The pair of bus terminals 18 extend between groups of four capacitor elements 28 on one of the laminar bus plate arrangement 22. In this embodiment, each of the capacitor elements 28 is a substantially identical wound film capacitor having a generally cylindrical shape.

Figure 4:
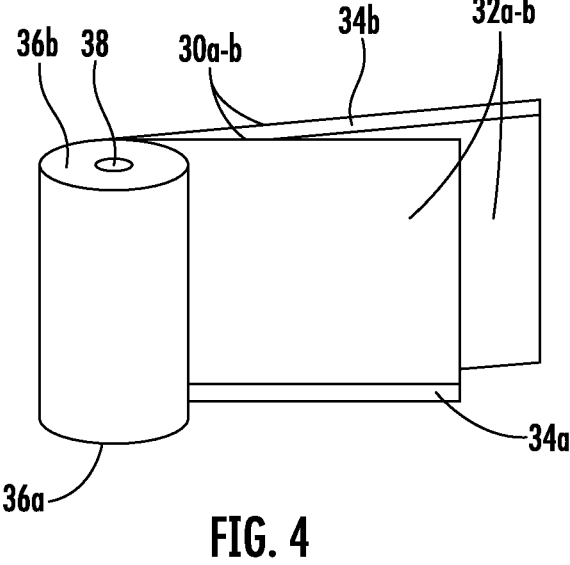
FIG. 4 illustrates certain aspects of the construction of a wound film capacitor element that may be used in the capacitor assembly of FIG. 1.

As shown in FIG. 4, one skilled in the art will appreciate that wound film capacitors are formed from first and second sheets 30a-b of metalized dielectric film which are wound together. In this regard, the dielectric film, which may for example comprise polypropylene, is metalized as indicated at 32a-b (e.g., by zinc or aluminum) to provide respective insulating margins 34a-b at first and second ends, respectively. The result is that metalization of one polarity or the other extends to respective ends of the wound structure. Thermal spray (e.g., by zinc alloy) is then applied to the end surfaces (faces) of the wound structure to form respective first polarity and second polarity terminals 36a-b of the capacitor element. The wound structure defines a bore 38 along its axis.

Figure 5:
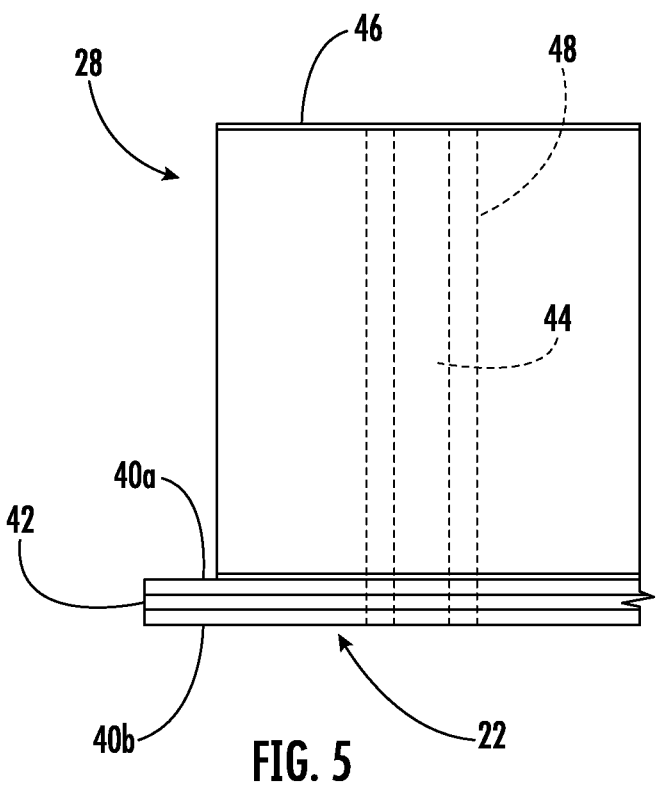
FIG. 5 is a diagrammatic side view of a capacitor element of the capacitor assembly of FIG. 1 mounted to a laminar bus plate arrangement.
Figure 6:
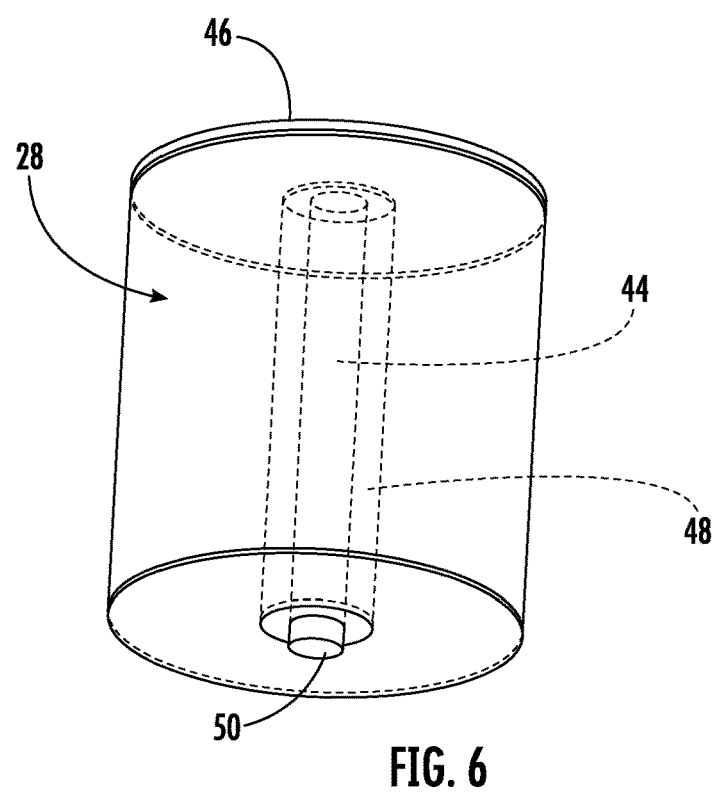
FIG. 6 is a diagrammatic perspective view of the capacitor element of FIG. 5.
Figure 7:
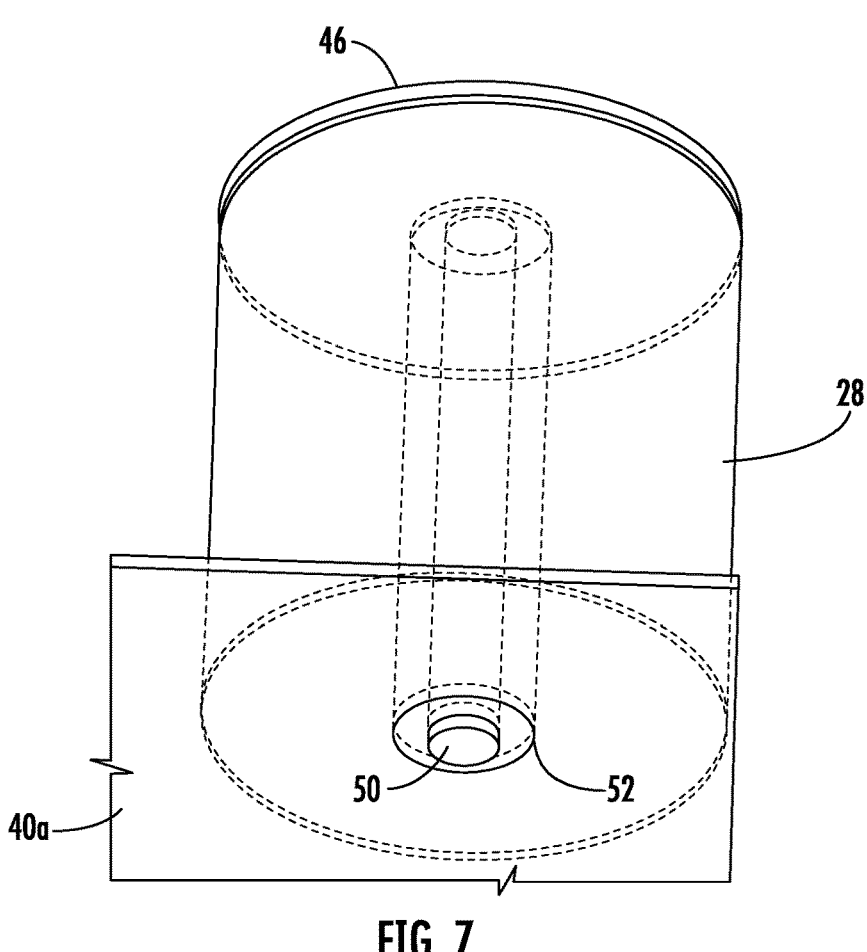
FIG. 7 is a bottom view of a first polarity bus plate having an aperture through which a conductive thru-rod of a capacitor element extends.

Referring now to FIGS. 5-7, one manner in which capacitor elements 28 may be mounted to laminar bus plate arrangement 22 is illustrated. As shown in FIG. 5, laminar bus plate arrangement 22 comprises at least one first polarity bus plate 40a and at least one second polarity bus plate 40b separated by a sheet-like insulator 42. As one skilled in the art will appreciate, bus plates 40a and 40b may typically be formed of suitable conductive metal such as copper.

The first polarity terminal of the capacitor element 28 is proximal to and makes electrical connection with the first polarity bus plate 40a. The second polarity terminal of the capacitor element 28 is distal from the laminar bus plate arrangement 22 but electrically connected to the second polarity bus plate 40b. In this embodiment, such connection is achieved by an elongate conductor in the form of a thru-rod 44 that extends along the axis of capacitor element 28.

The distal end of thru-rod 44 is connected to a conductive disc 46 that is adjacent to and directly contacts the second polarity terminal of capacitor element 28. A tubular insulator 48 is coaxial to thru-rod 44 to keep the polarities separate (i.e., to prevent shorting). An extended portion 50 (FIG. 6) of thru-rod 44 passes through an associated aperture 52 (FIG. 7) in first polarity bus plate 40a so that it may contact second polarity bus plate 40b. One skilled in the art will appreciate that solder or a suitable conductive adhesive may be used to facilitate the electrical connections.

The use of thru-rods 44 reduces the inductance in the capacitor assembly 10, thus reducing ripple currents and the concomitant heating that might otherwise occur. While a solid thru-rod is illustrated in FIGS. 5-7, embodiments are contemplated in which the thru-rods are hollow (tubular). Hollow thru-rods may be more economical and easier to solder than solid thru-rods. In addition, hollow thru-rods may allow the connection of a heat pipe or a flow of liquid coolant through the body of the capacitor element in some embodiments for even further temperature dissipation.

Figure 8:
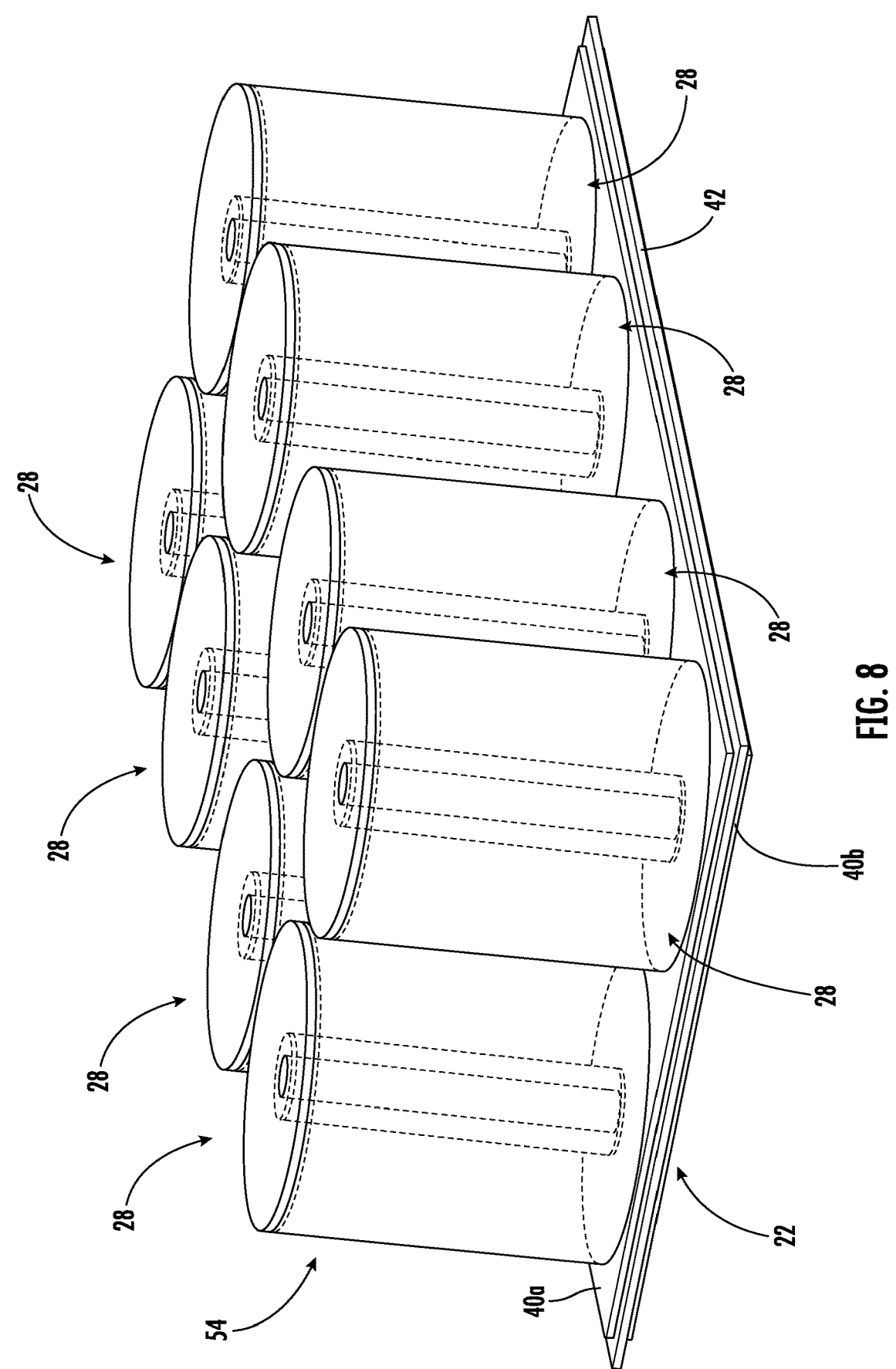
FIG. 8 is a perspective view of a single tier of capacitor elements mounted to a laminar bus plate arrangement in accordance with an embodiment of the present invention.
Figure 9:
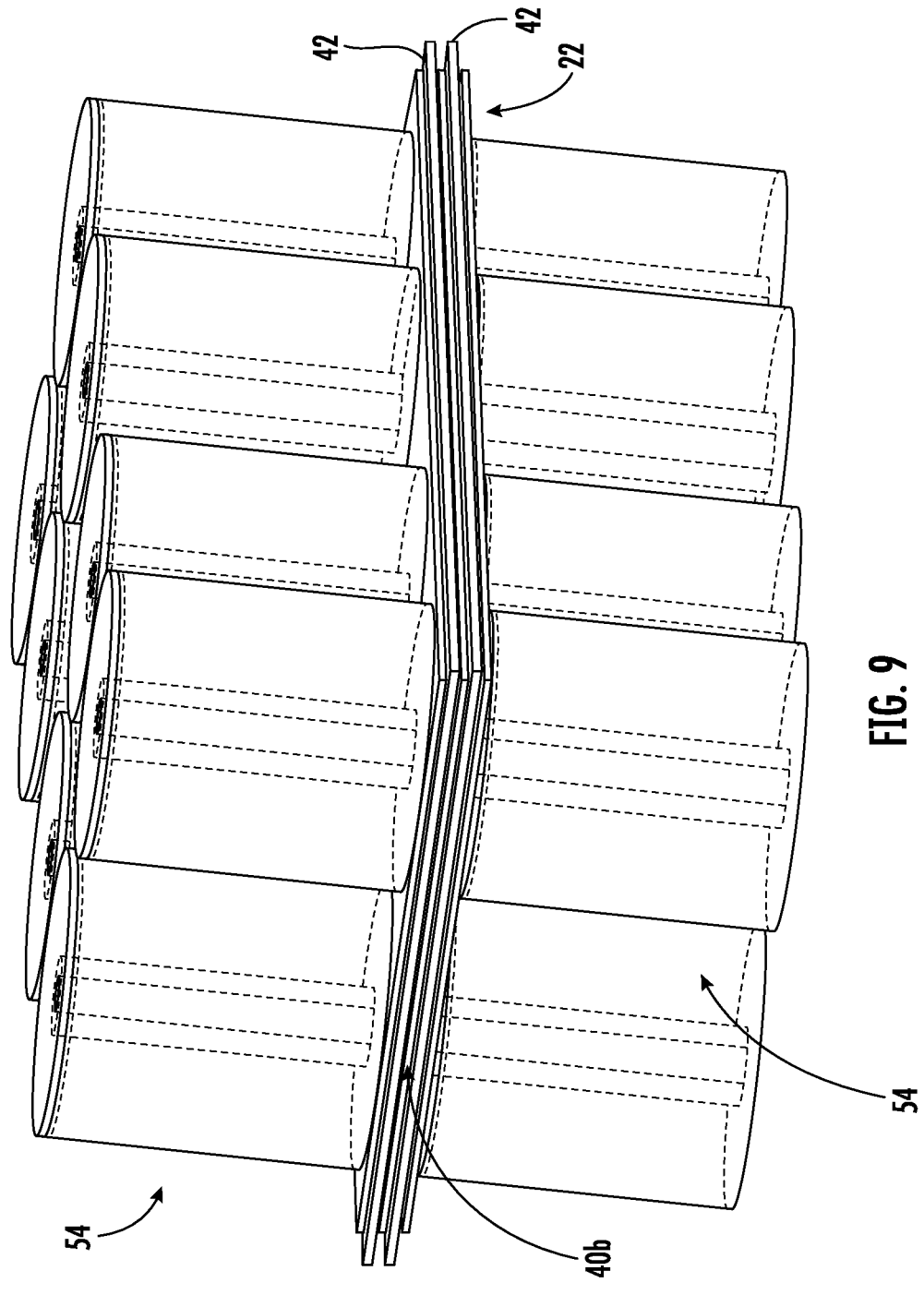
FIG. 9 illustrates two tiers of capacitor elements mounted back to back to respective sides of a laminar bus plate arrangement.

FIG. 8 illustrates a tier 54 of a sub-module's capacitor elements 28 mounted to one side of laminar bus plate arrangement 22. In FIG. 9, a second tier 54 has been juxtaposed to the first tier in back-to-back fashion. As a result, the second polarity bus plates 40*b* of the respective tiers abut one another in electrically conductive relationship. Solder or a suitable conductive adhesive may be utilized to facilitate the connection between the bus plates. As a result, the two second polarity bus plates 40*b* in this embodiment essentially function as a single, unitary bus plate. (In other embodiments, a single plate may be used instead of two juxtaposed plates.) So, the overall laminar bus plate arrangement 22 has a second polarity bus plate structure sandwiched between two first polarity bus plates 40*a* but electrically isolated therefrom by two sheet-like insulators 42.

Figure 10:
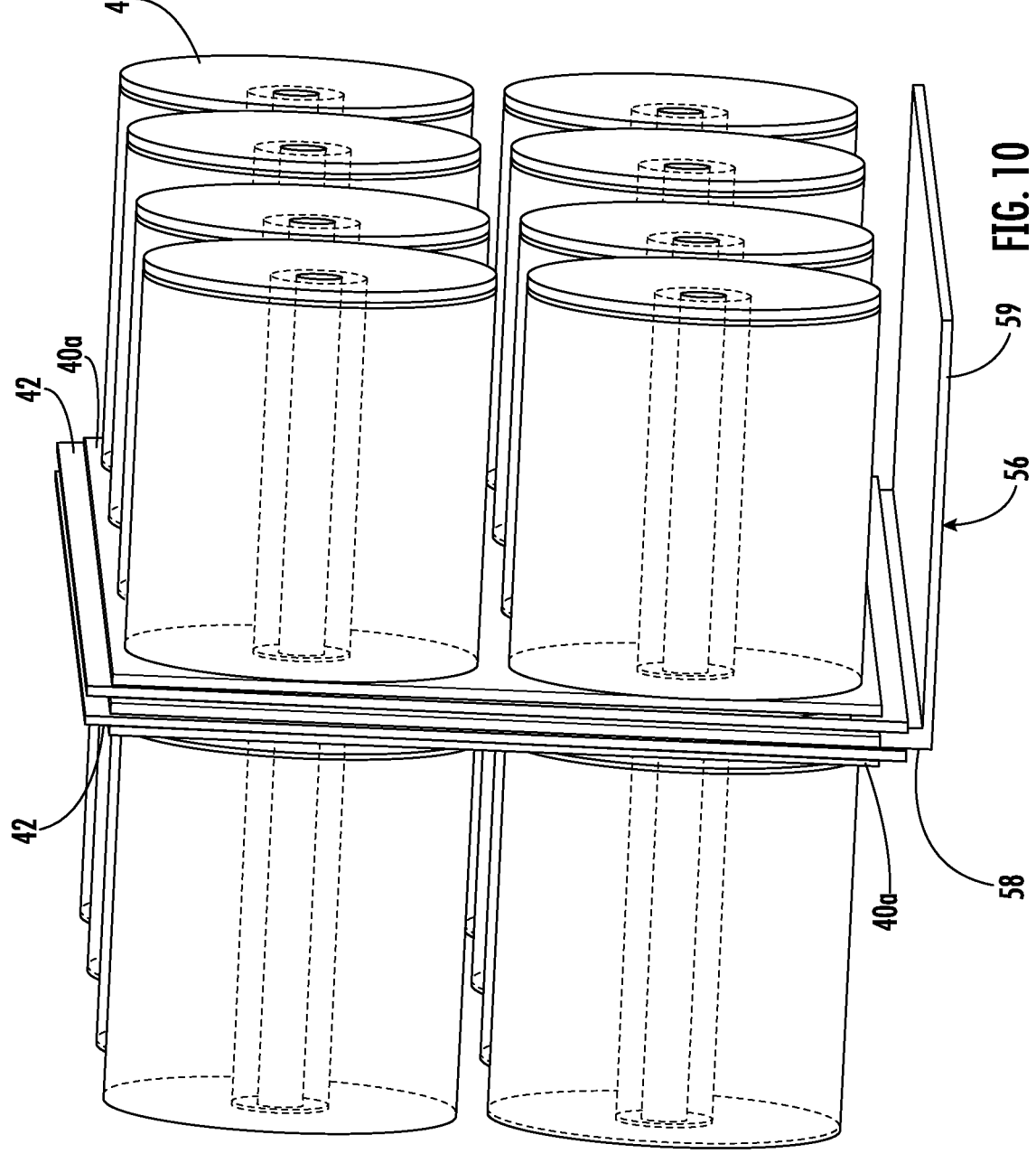
FIG. 10 illustrates the structure of FIG. 9 but with the addition of an ell providing a cooling plate.
Figure 11:
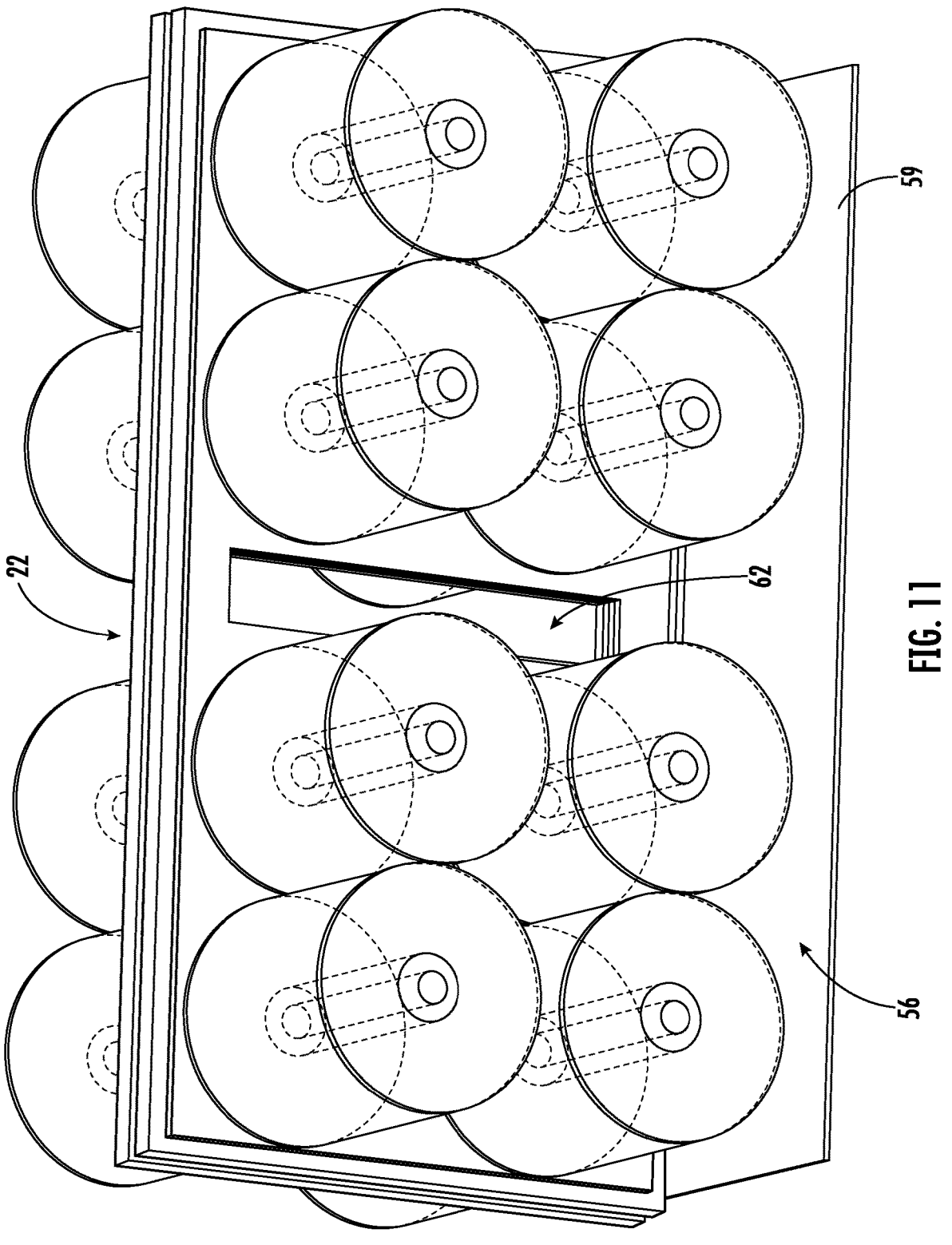
FIG. 11 is another view of the structure of FIG. 10 showing a window in the laminar bus plate arrangement by which bus terminals may be connected.
Figure 12:
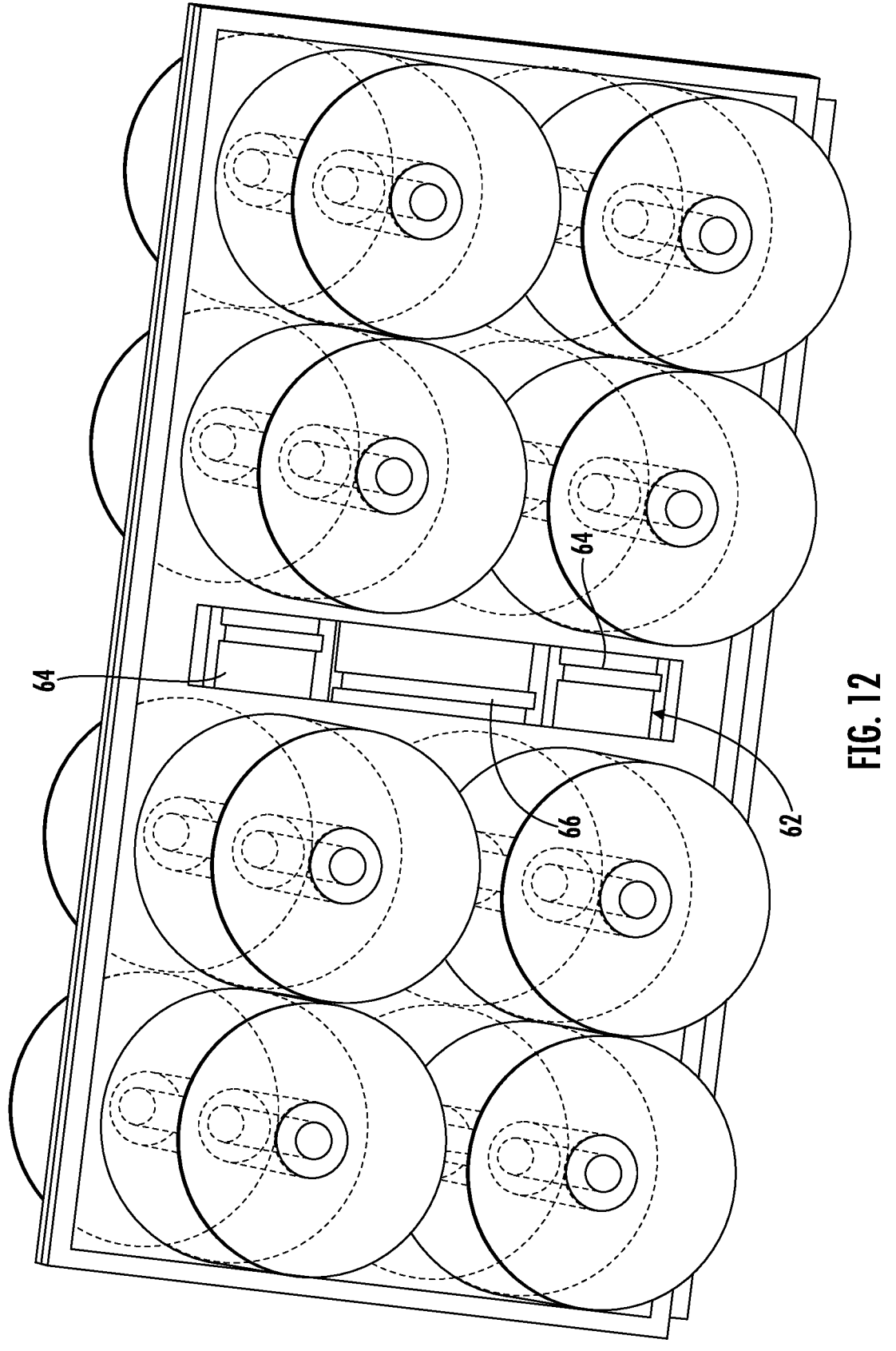
FIG. 12 is a view from the other side of the structure of FIG. 11 further showing terminal connection structures for connecting the bus terminals to the laminar bus plate arrangement.
Figure 13:
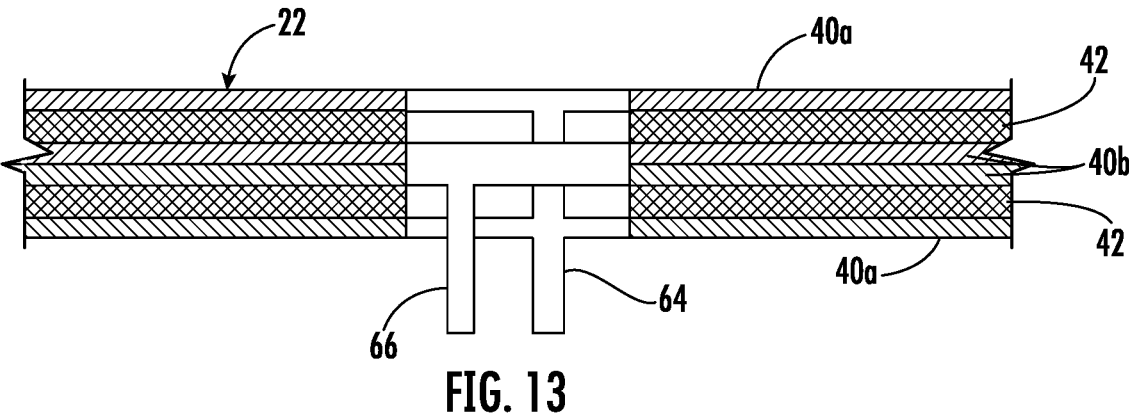
FIG. 13 is an enlarged diagrammatic cross-sectional view of the terminal connection structure and a portion of the laminar base plate arrangement.

In FIG. 10, the structure of FIG. 9 has been modified to include an ell 56. As shown, ell 56 has a first portion 58 which is connected to the second polarity (inner) bus plates 40*b* so as to be in thermal communication therewith. Ell 56 has a second portion 59 that extends orthogonally to the first portion 56 to form a large cooling plate. Heat collected at the second polarity plates 40*b* (e.g., at discs 46 and conducted along thru-rods 44), thus travels to first portion 58 and cooling plate 59 for removal. Ell 56 may be formed of the same material as the bus plates (e.g., copper plate). While ell 56 is electrically connected to second polarity bus plates 40*b* in this embodiment, this is of no consequence because ell 56 does not provide a current path.

Figure 14:
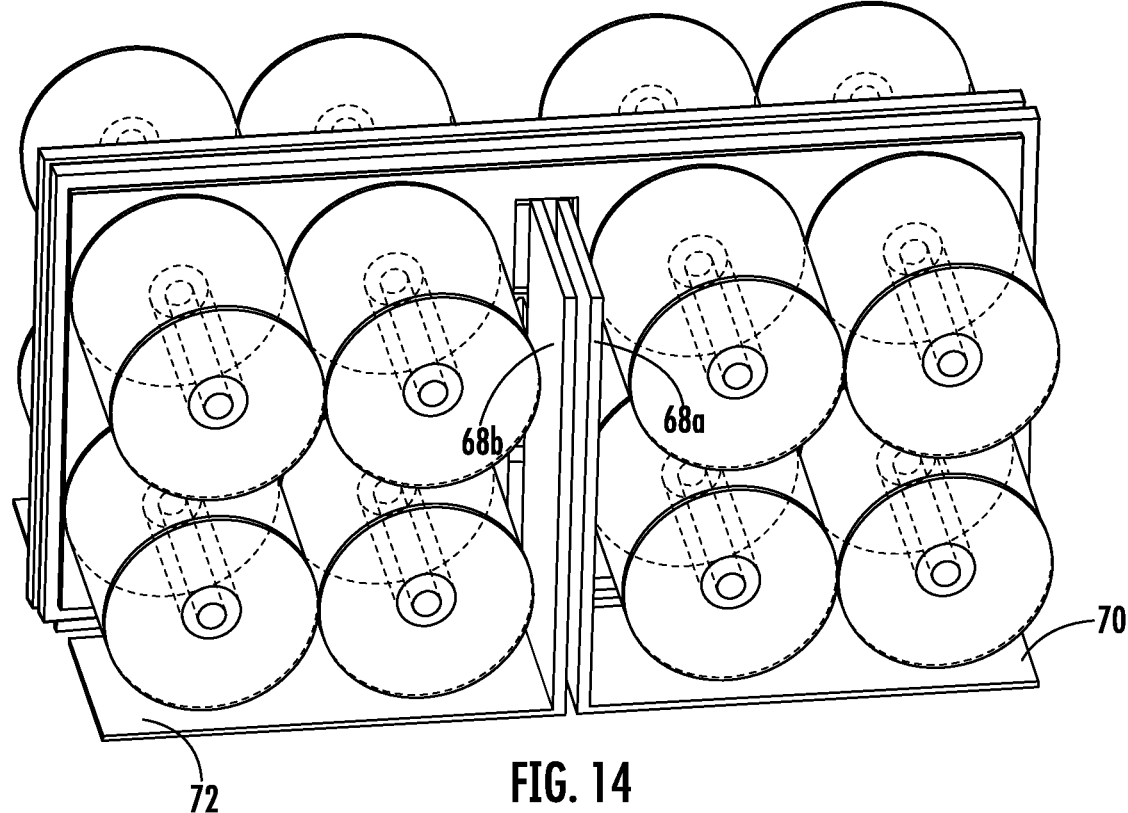
FIG. 14 is a view of the side shown in FIG. 12 with bus terminals and associated cooling plates.

Referring now to FIGS. 11-14, attachment of the bus terminals 18 to the laminar bus plate arrangement 22 will be explained. In this embodiment, laminar bus plate arrangement 22 defines a window 62 that exposes the various bus plate layers. One or more H-shaped connection structure(s) 64 provide electrical connection to the first polarity bus plates 40*a*. One or more T-shaped connection structure(s) 66 are connected to the second polarity plates 40*b*. As shown in FIG. 14, connection structures 64 and 66 are in electrical communication with terminal portions 68*a* and 68*b*, respectively. Connection structures 64 and 66, as well as terminal portions 68*a* and 68*b*, may be formed of copper plate or another suitable material.

As FIG. 14 also illustrates, respective cooling plates 70 and 72 are attached in this embodiment to terminal portions 68*a* and 68*b*. In some preferred embodiments, cooling plates 70 and 72 may be integral (or unitary) with terminal portions 68*a* and 68*b*, but extend orthogonally therefrom so as to be coplanar with cooling plate 59 of ell 56. Similar to ell 56, cooling plates 70 and 72 are electrically connected to terminal portions 68*a* and 68*b*, but the cooling plates do not provide a current path to the base plate. Toward this end, the cooling plates are mounted on base plate 12, but rest on the thermally conductive but electrically insulative sheet 24 (FIG. 3). Heat collected at the bus plates thus conducts to the cooling plates for removal. Specifically, heat from the otherwise hot conductors (having the highest ripple current density) is thermally shunted down to the base plate surface. As shown in FIG. 3, extended terminal portions 74*a* and 74*b* may then be attached to respective terminal portions 68*a* and 68*b* to complete the first and second polarity terminals 26*a* and 26*b*.

The location of bus terminal pair 18 between equal numbers of capacitor elements of each sub-module advantageously provides spatial symmetry in the inflow and outflow of current. This symmetry contributes to the relatively low inductance of the overall capacitor assembly.

Extended terminal portions 74*a* and 74*b* extend beyond the bounds of the potting compound.

Figure 15:
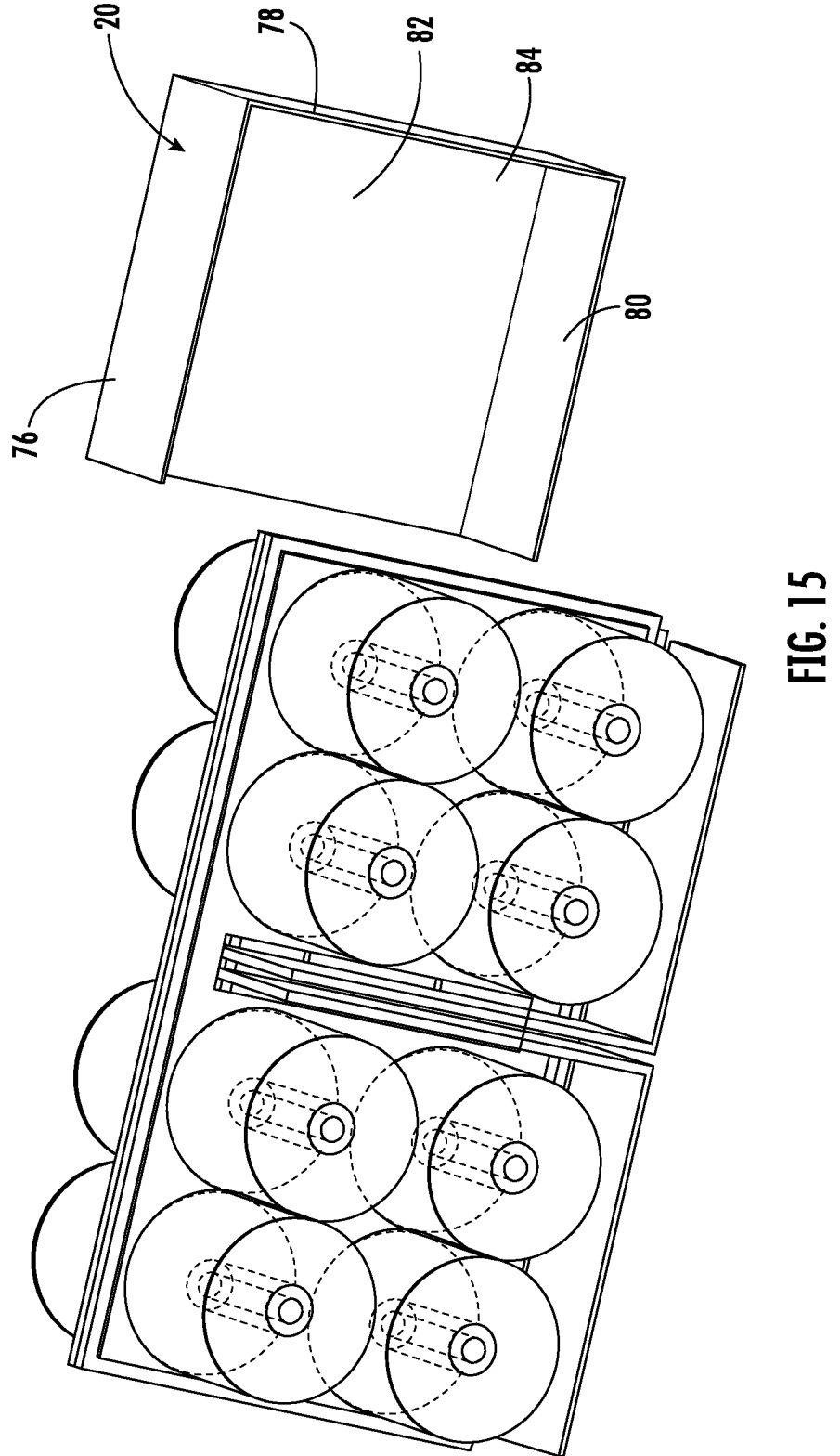
FIGS. 15 through 17 show the addition of thermal shields to the structure of FIG. 14.
Figure 16:
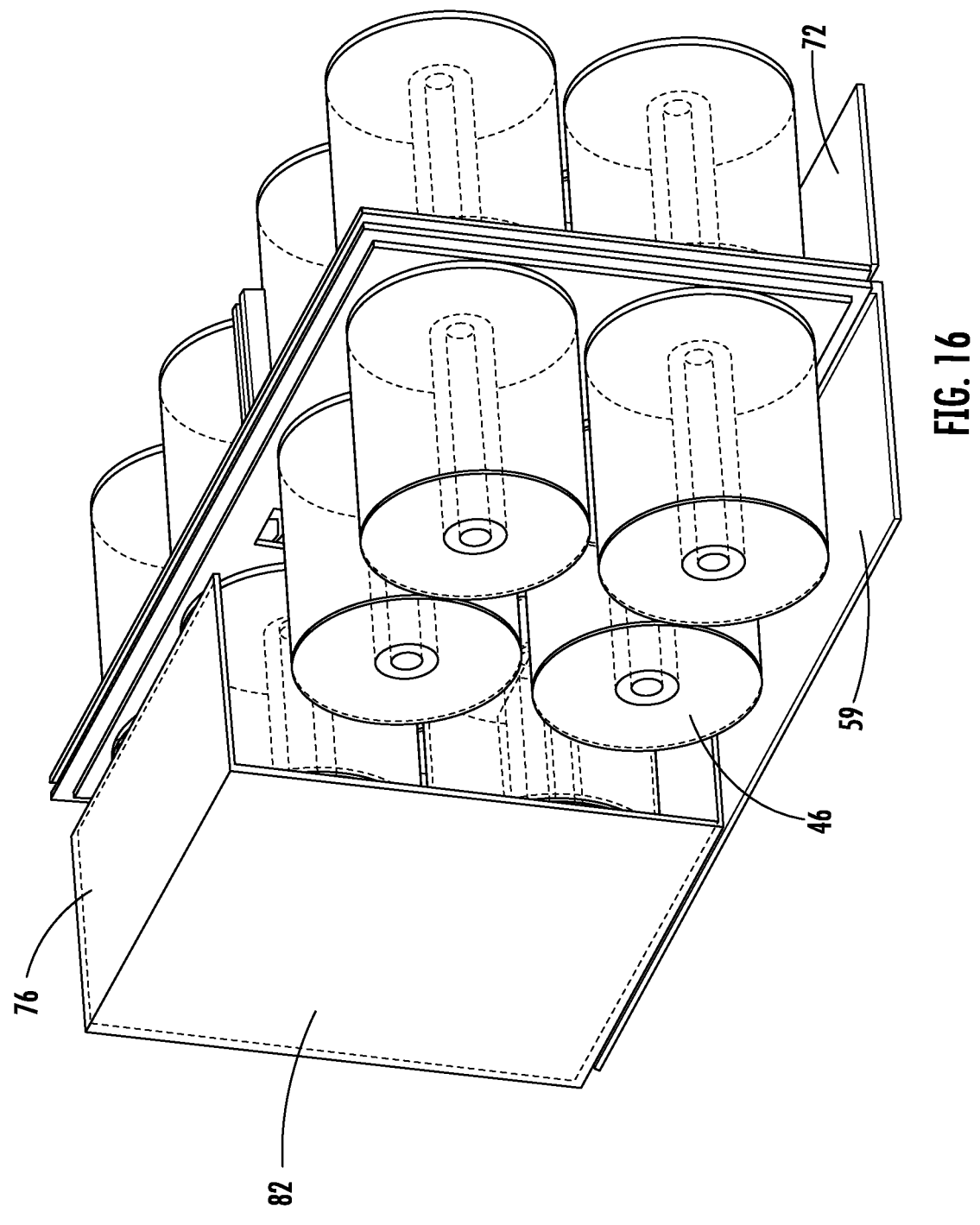
Figure 17:
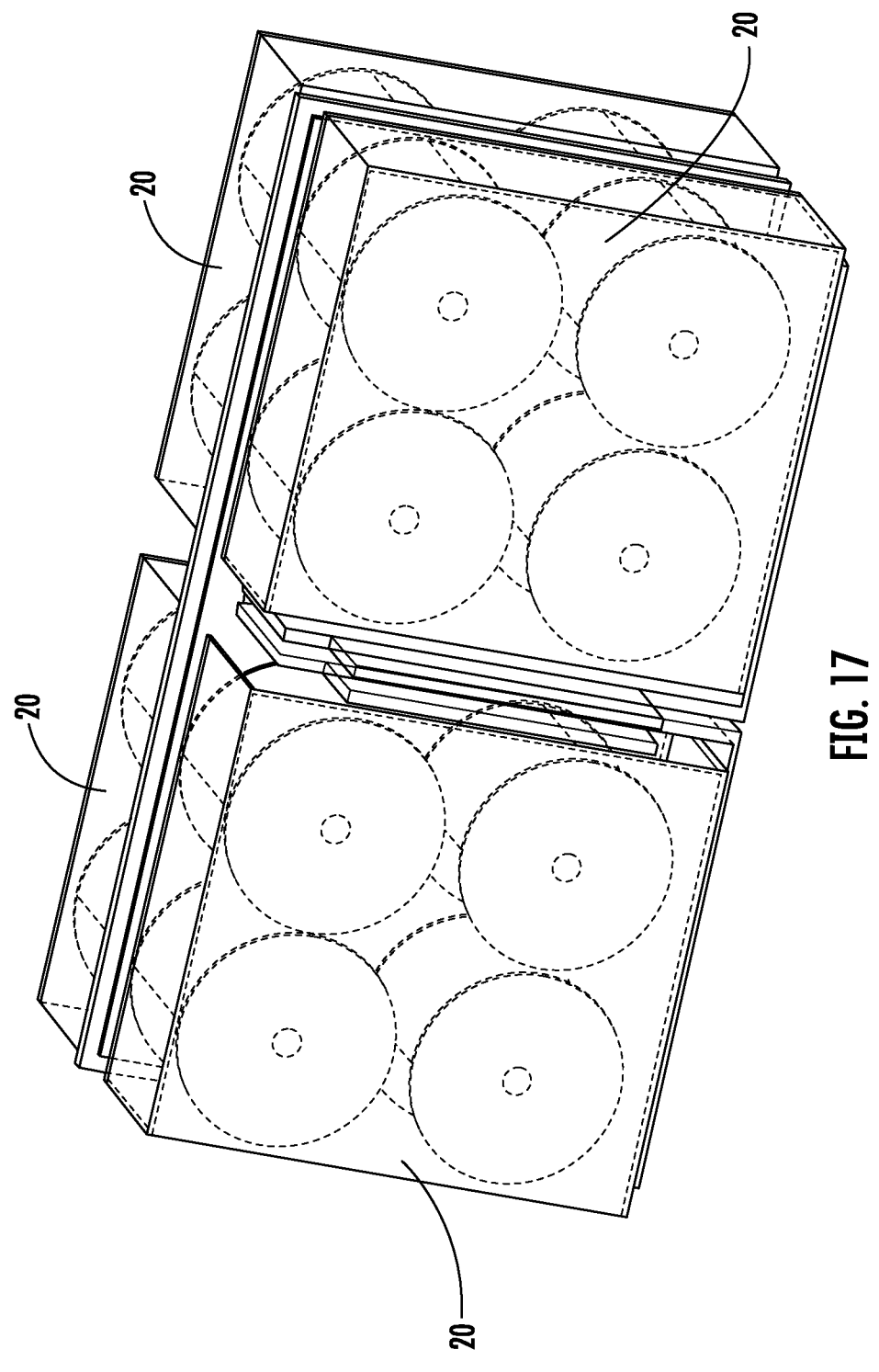

Referring now to FIGS. 15-17, certain aspects regarding thermal shields 20 may be most easily explained. In this embodiment, each sub-module may have a total of four separate thermal shields, each associated with four of the sixteen capacitor elements 28. Each thermal shield comprises a four-sided box having top, end, and bottom smaller sides 76, 78, and 80, and one larger side 82. For example, the box may be formed of copper foil. An electrically insulative layer 84 is located on the inner face of side 82 in this case to prevent shorting with the discs 46 of the respective capacitor elements. Alternatively, the inside face of side 82 may simply be sufficiently spaced from the discs to prevent shorting. In cases where the capacitor elements are potted, the interposing potting compound in such embodiments serves as an insulation layer.

In this embodiment, the bottom side 80 of each thermal shield 20 is attached to one of the cooling plates 59, 70, or 72, such as by soldering. This both fixes the thermal shield in position and provides a thermally conductive path to the cooling plates (and to the base plate). As a result, heat collected by the thermal shields (such as heat from the ambient environment) will be transferred to the base plate and the isothermal surface. As can be seen in FIG. 17, the thermal shields 20 simply electrically float at the potentials of the cooling plates ("base flanges").

Figure 18:
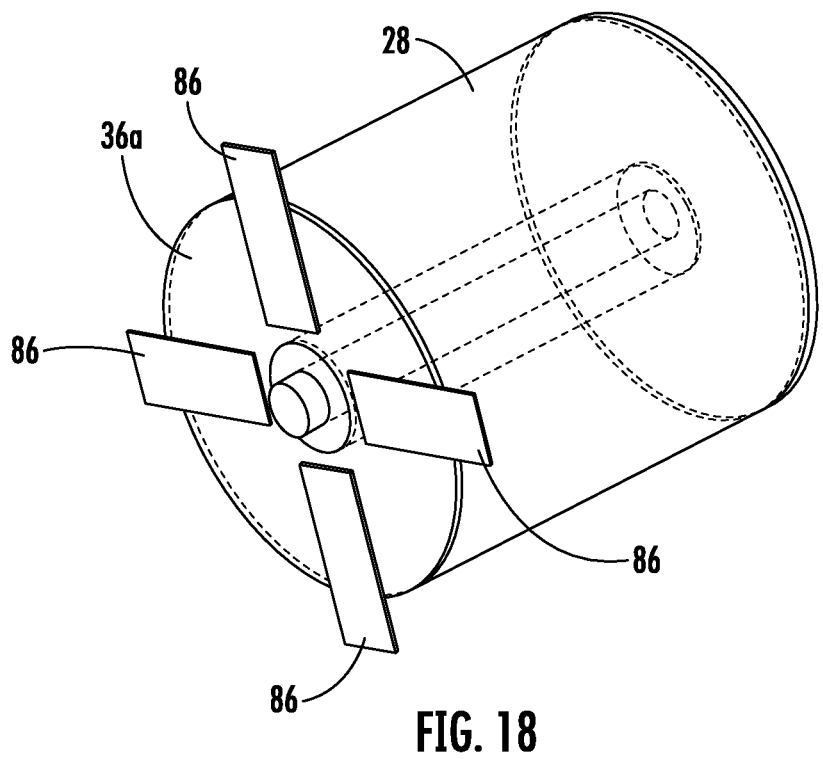
FIGS. 18 and 19 show intermediate tabs that may be utilized to connect the proximal first polarity terminals of the capacitor elements to the first polarity bus plate of the laminar bus plate arrangement.
Figure 19:
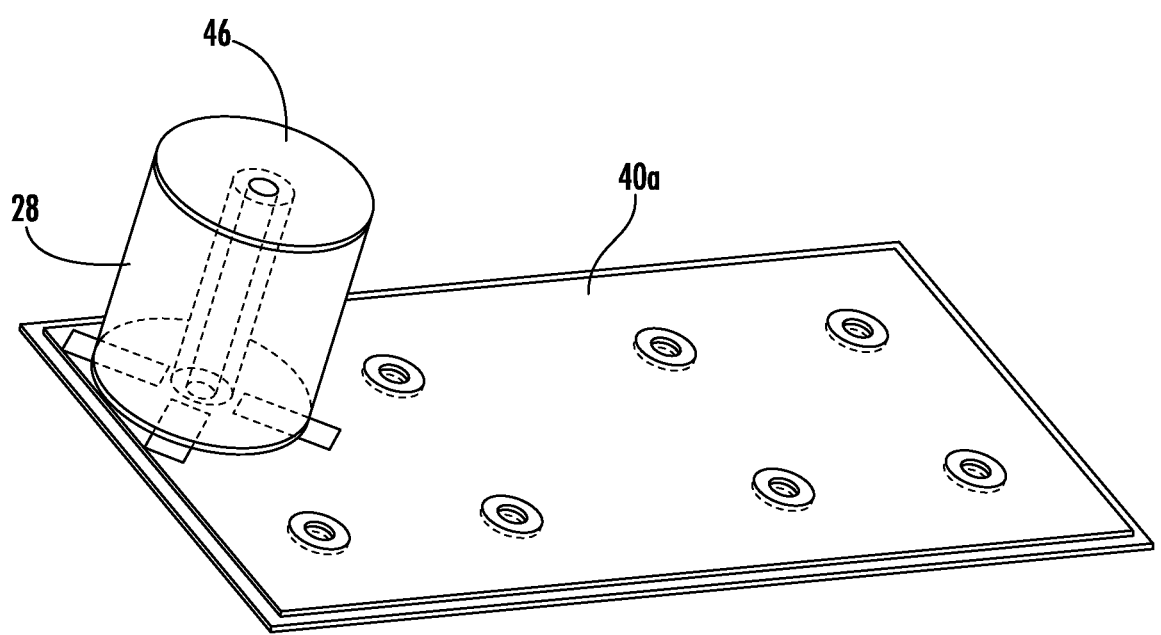

While embodiments are contemplated in which the first polarity terminal 36*a* of the capacitor elements 28 is soldered directly to the first polarity bus plate, other embodiments may utilize an extension feature to facilitate this connection. Referring now to FIGS. 18 and 19, one such embodiment is shown using four tabs 86 extending radially from a location on the end to a location outside the diameter of the wound structure. For example, the tabs 86 may be formed of copper foil (e.g., 10-mil×¼") soldered or stitch welded to the first polarity terminal 36*a*. This allows the extension(s) to be soldered or welded afterwards to the typically more massive bus plate without overheating the plastic film winding.

Figure 20:
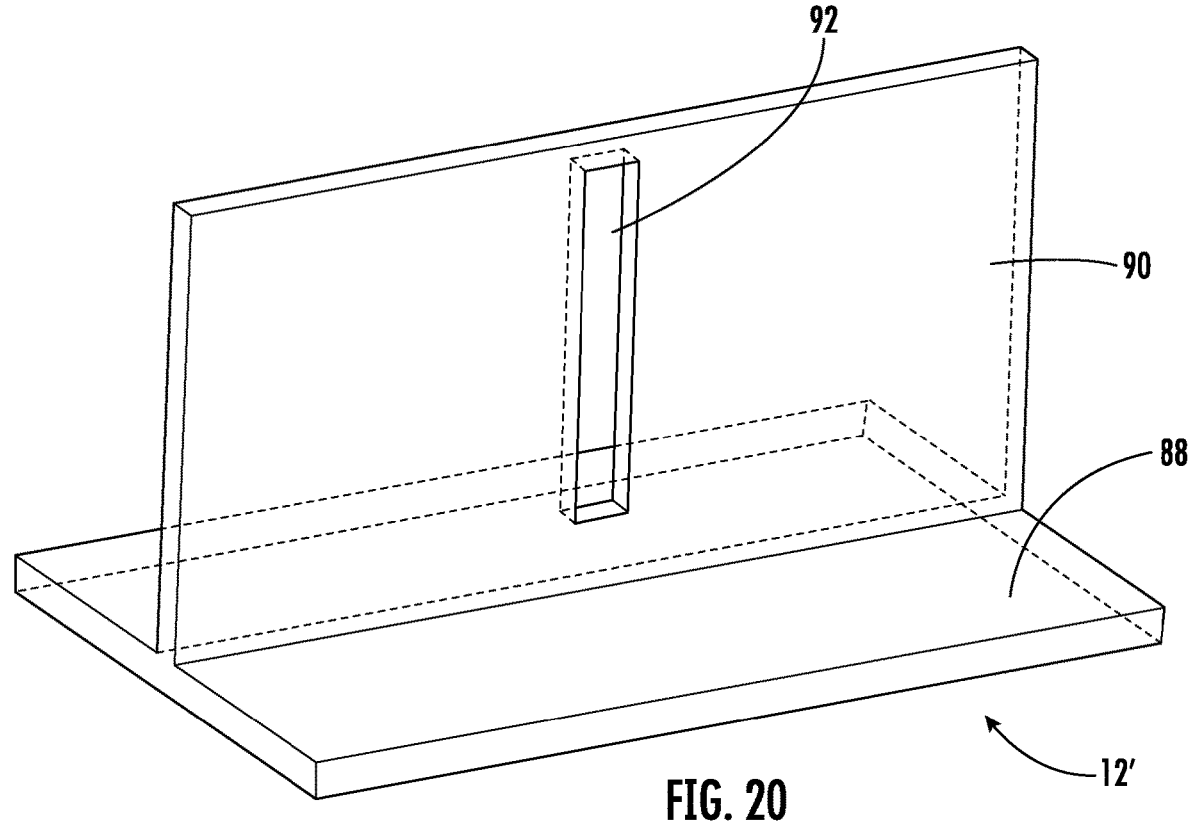
FIG. 20 is an isometric view of an alternative base plate having the form of an inverted T.

FIG. 20 illustrates an alternative form of a base plate 12' in accordance with the present invention. In this case, base plate 12' is in the form of an inverted T having a lower horizontal portion 88 with an integral extension 90 of high thermal conductance up into the bus plate assembly area. In this case, extension 90 defines a rectangular window 92 that aligns with the window 62 in the laminar bus plate arrangement 22. As one skilled in the art will appreciate, base plate 12' may augment or obviate some or all of the copper ells and cooling plates in the previous embodiment.

Figure 21:
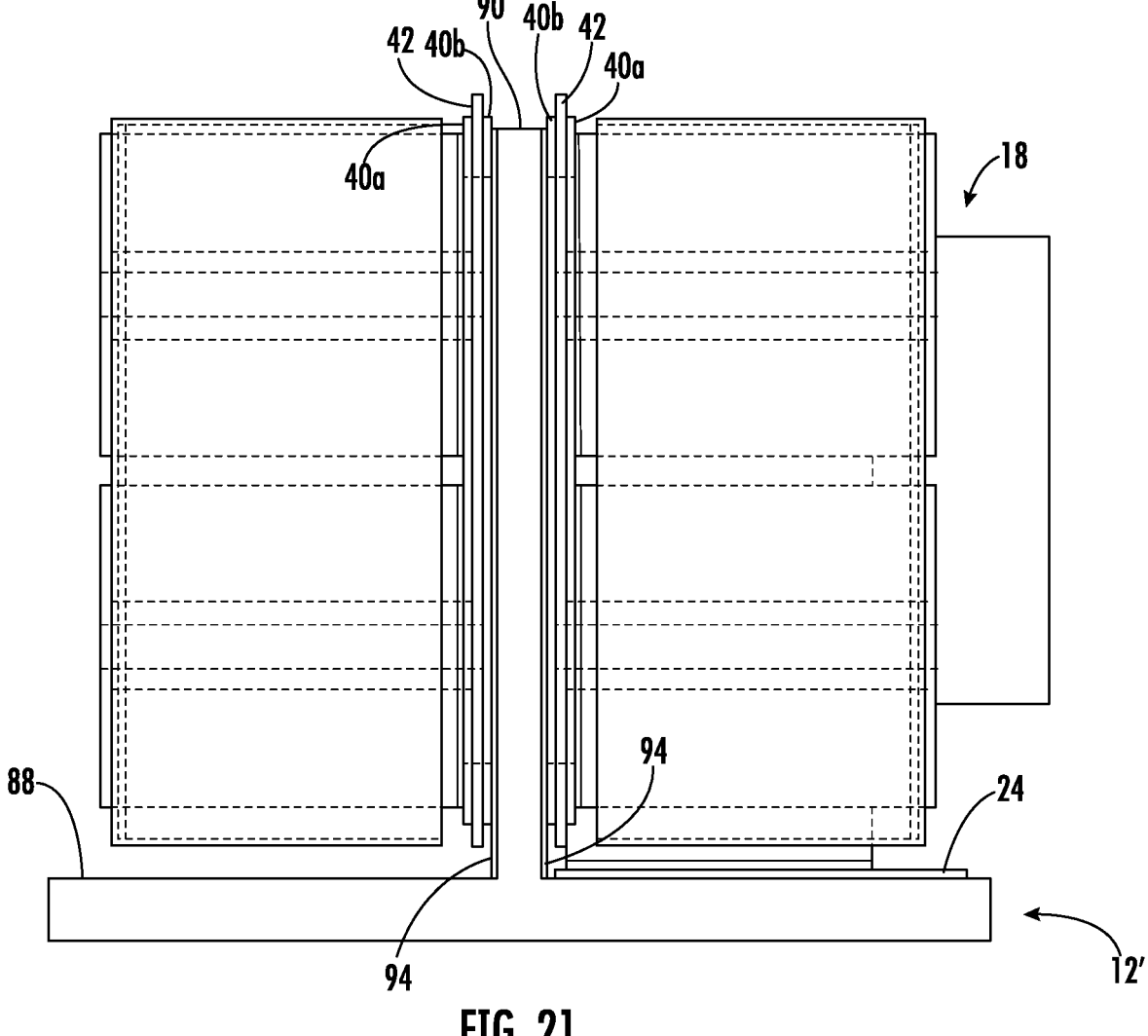
FIGS. 21 and 22 are an end view and an isometric view, respectively, showing components of a capacitor assembly utilizing the base plate of FIG. 20.
Figure 22:
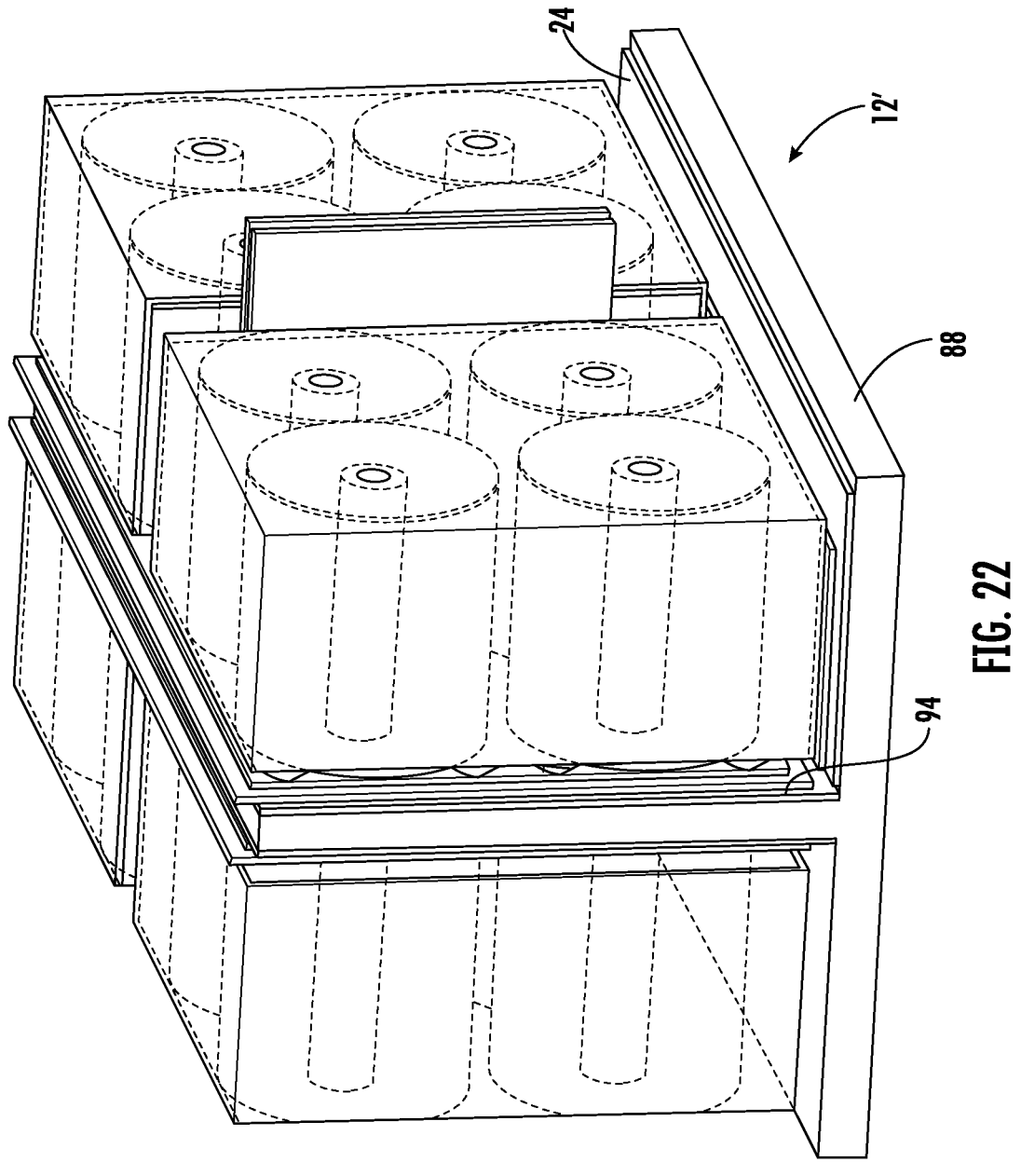

FIGS. 21 and 22 show various other components of the capacitor assembly sub-module mounted to the base plate 12'. It will be appreciated that the connection structures 64 and 66 are modified so as to accommodate the width of extension 90. Note that cooling plate 59 and the thermally conductive but electrically insulative sheet 24 under it have been removed in this embodiment. Two new vertical layers 94 of thermally conductive but electrically insulative sheet are provided to electrically isolate the inner copper bus plates from the base plate's vertical wall 90.

Figure 23:
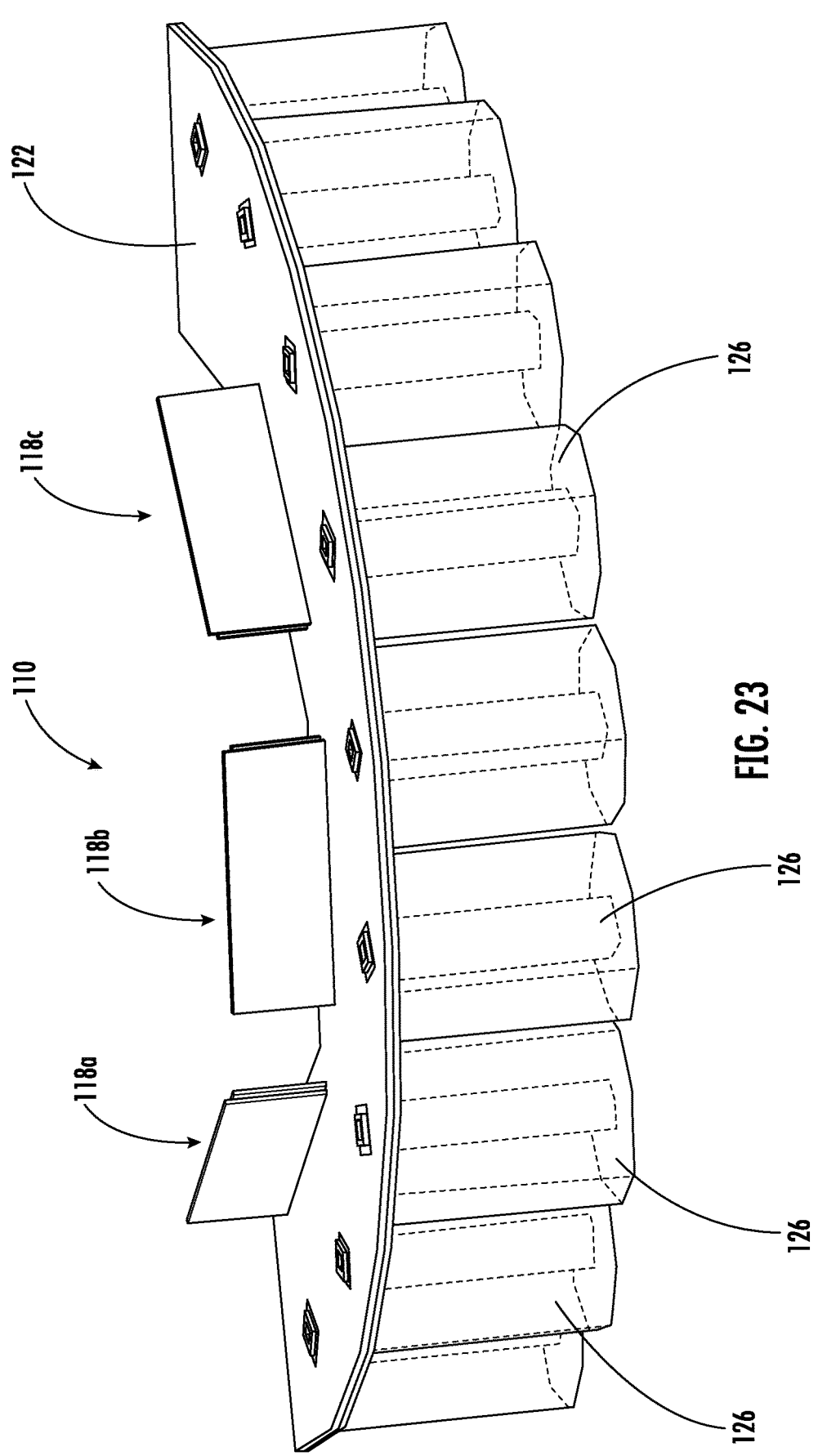
FIG. 23 illustrates an alternative embodiment in which a plurality of capacitor elements are mounted to a laminar bus plate arrangement in an arc.

A capacitor assembly 110 constructed in accordance with an alternative embodiment of the present invention is illustrated in FIG. 23. As shown, a plurality of wound film capacitor elements 126 (e.g., nine such capacitor elements 126 are provided in the illustrated embodiment) are mounted to a laminar base plate arrangement 122. In this case, the capacitor elements 126 are arranged along an arc to accommodate other equipment with which the capacitor assembly 110 is used.

Similar to laminar bus plate arrangement 22 discussed above, laminar bus plate arrangement 122 has first and second polarity bus plates separated by a sheet-like insulator. The proximal end terminal of each capacitor element 126 is in direct electrical connection with the first polarity bus plate whereas the distal end terminal of each capacitor element 126 is in electrical connection with the second polarity bus plate via an internal thru-rod similar to thru-rod 44. Current flows to and from assembly 110 via three pairs of spaced apart bus terminals 118*a-c.* As will be appreciated, each pair of bus terminals has a first terminal of one polarity (+or −) and a second terminal of the opposite polarity (− or +).

Figure 24:
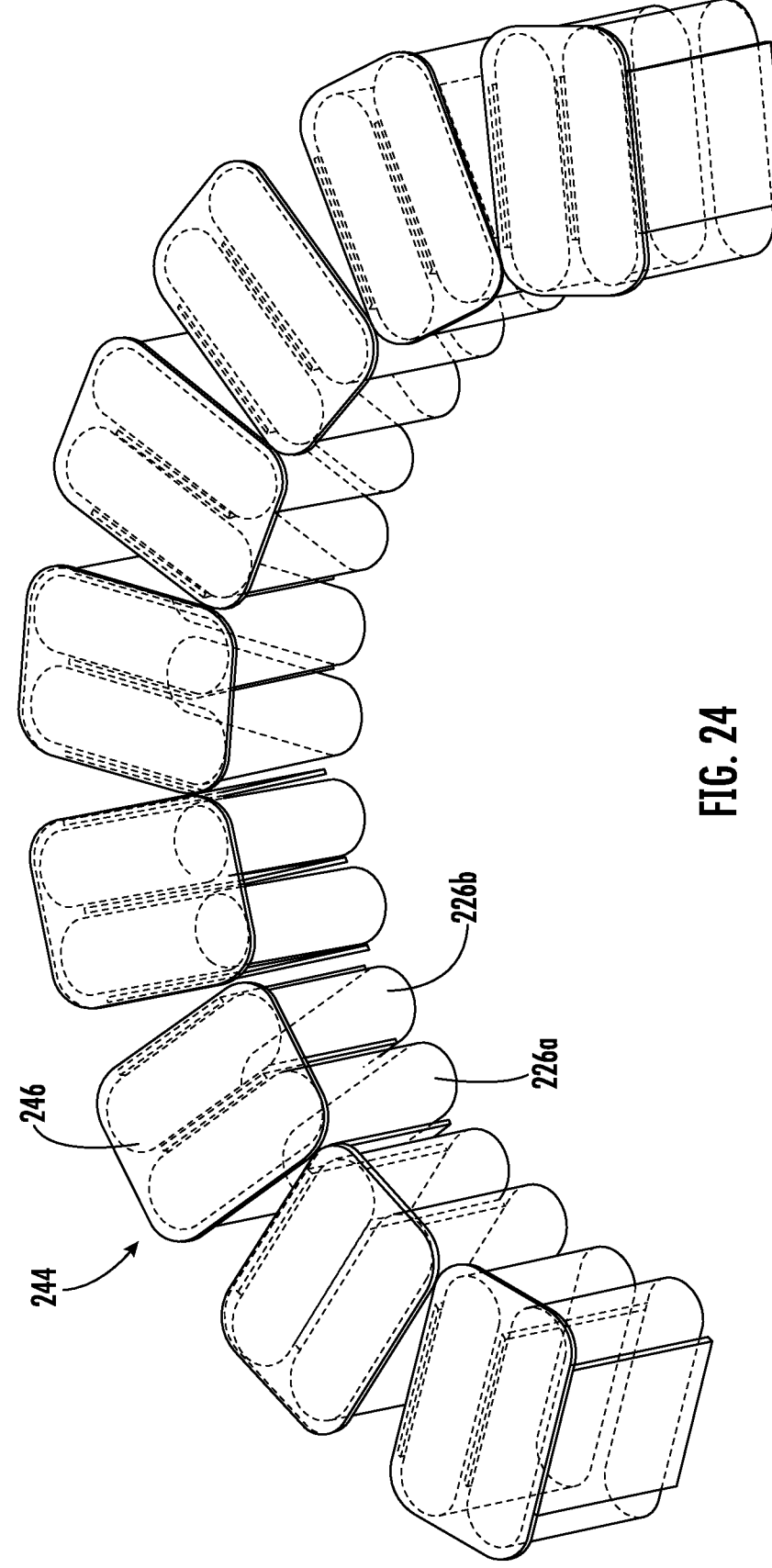
FIG. 24 illustrates a modified form of the embodiment of FIG. 23 utilizing pairs of oblong capacitor elements.
Figure 25:
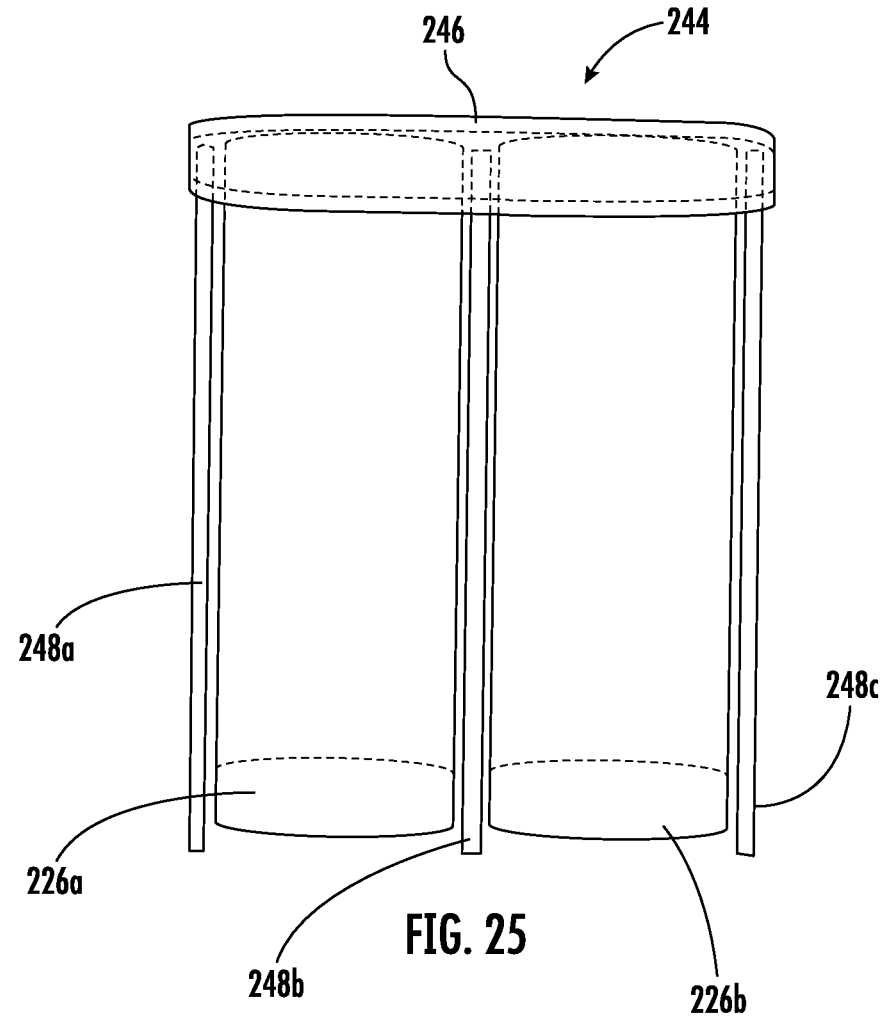
FIG. 25 shows one pair of oblong capacitor elements interconnected via a combined conductor and shield structure.

FIG. 24 illustrates a modification to the embodiment of FIG. 23 (without showing the laminar bus plate arrangement and bus terminals) in which pairs of oblong capacitor elements 226*a-b* are used in lieu of each cylindrical capacitor element 126. Oblong capacitor elements 226 also have end surfaces forming first and second polarity terminals, e.g., formed by end sprayed zinc. The first polarity end terminal is proximal to and electrically connected to the first polarity bus plate. Referring now also to FIG. 25, the second polarity end terminal is connected to the second polarity bus plate by a conductor that passes through an aperture in the first polarity bus plate without electrical connection. For example, the conductor may take the form of a M-shaped structure 244 having a top 246 and three legs 248*a-c.* Leg 248*b* is located between capacitor elements 226*a* and 226*b,* whereas legs 248*a* and 248*c* are located on the sides. In this case, the respective apertures in the first polarity bus plate may be in the form of elongate slots. In addition to providing electrical connection between the distal terminal of the capacitor elements and the second polarity bus plate, it will be appreciated that structure 244 provides some thermal conduction.

It will be appreciated that embodiments of the present invention provide advantages in comparison with the prior art. For example, smooth impedance behavior and mitigation of bus resonance issues are achieved through novel connections (e.g., thru-rods) to a low impedance laminar bus plate arrangement. These benefits are especially advantageous in large modules (e.g., two liters and up) that have multiple pairs of terminals. Enhanced thermal conductance to a heat sink surface can also be achieved.

It can thus be seen that the present invention provides a novel capacitor assembly. Thus, while one or more preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

What is claimed is:

1. A capacitor assembly comprising:
   a laminar bus plate arrangement having at least one first polarity bus plate and at least one second polarity bus plate separated by a sheet-like insulator;
   at least one pair of bus terminals having a first polarity bus terminal electrically connected to said first polarity bus plate and a second polarity bus terminal electrically connected to said second polarity bus plate;
   a plurality of wound film capacitor elements each having a first end surface and a second end surface defining a proximal first polarity terminal and a distal second polarity terminal, respectively;
   an elongate conductor extending along an axis of each of said capacitor elements, said elongate conductor providing electrical communication between the second polarity terminal of the respective capacitor element and the second polarity bus plate, wherein each of said elongate conductors comprises a conductive thru-rod; and
   said first polarity terminal of each of said capacitor elements being electrically connected to the first polarity bus plate,
   wherein the at least one pair of bus terminals extends from the laminar bus plate arrangement and extends between wound film capacitor elements of the plurality of wound film capacitor elements.

2. A capacitor assembly as set forth in claim 1, wherein said first polarity terminal of each of said capacitor elements is proximal to and is in electrical connection with said first polarity bus plate.

3. A capacitor assembly as set forth in claim 2, wherein a respective coaxial insulator being located about at least a portion of said conductive thru-rod.

4. A capacitor assembly as set forth in claim 3, wherein said conductive thru-rod extends through an aperture in said first polarity bus plate for connection to said second polarity bus plate.

5. A capacitor assembly as set forth in claim 1, comprising a first cooling plate in thermally conductive relationship with but orthogonal to said second polarity bus plate.

6. A capacitor assembly as set forth in claim 5, wherein said first cooling plate comprises a portion of an ell integral with said second polarity bus plate.

7. A capacitor assembly as set forth in claim 6, further comprising a base plate in thermally conductive but electrically insulative relationship with said first cooling plate.

8. A capacitor assembly as set forth in claim 5, comprising second and third cooling plates in thermally conductive relationship with said first polarity bus terminal and said second polarity bus terminal, respectively.

9. A capacitor assembly as set forth in claim 8, further comprising a base plate in thermally conductive but electrically insulative relationship with said first cooling plate, said second cooling plate, and said third cooling plate.

10. A capacitor assembly as set forth in claim 9, further comprising at least one thermal shield at least partially surrounding at least some of said capacitor elements, said thermal shield being in thermally conductive relationship with at least one of said first cooling plate, said second cooling plate, and said third cooling plate.

11. A capacitor assembly as set forth in claim 10, wherein said thermal shield has a multi-sided box-like structure.

12. A capacitor assembly as set forth in claim 1, wherein said laminar bus plate arrangement comprises two of said first polarity bus plates respectively separated from said at least one second polarity bus plate by respective of said sheet-like insulators.

13. A capacitor assembly as set forth in claim 12, comprising a first number of said capacitor elements mounted to a first side of said laminar bus plate arrangement and a second number of said capacitor elements mounted to a second side of said laminar bus plate arrangement such that said first number of said capacitor elements and said second number of said capacitor elements are back-to-back.

14. A capacitor assembly as set forth in claim 13, wherein said first number of said capacitor elements and said second number of said capacitor elements comprise an equal number of said capacitor elements.

15. A capacitor assembly as set forth in claim 1, wherein said at least one second polarity bus plate comprises a pair of said second polarity bus plates juxtaposed to and in electrical communication with one another.

16. A capacitor assembly as set forth in claim 1, comprising at least 9 of said capacitor elements.

17. A capacitor assembly as set forth in claim 1, comprising at least 16 of said capacitor elements.

18. A capacitor assembly as set forth in claim 1, comprising at least 32 of said capacitor elements.

19. A capacitor assembly as set forth in claim 1, comprising at least 48 of said capacitor elements.

20. A capacitor assembly as set forth in claim 1, wherein said laminar bus plate arrangement and said plurality of capacitor elements are at least partially encased in a potting compound.

21. A capacitor assembly as set forth in claim 1, wherein said at least one pair of bus terminals comprises a plurality of pairs of said bus terminals spaced apart from one another.

22. A capacitor assembly as set forth in claim 1, wherein said at least one pair of bus terminals extend orthogonally from said laminar bus plate arrangement.

23. A capacitor assembly comprising:
- a laminar bus plate arrangement having a multilayer structure in which a pair of outer first polarity bus plates are interposed by at least one second polarity bus plate, wherein said multilayer structure further includes first and second sheet-like insulators separating said first polarity bus plates from said at least one second polarity bus plate;
- at least one pair of bus terminals having a first polarity bus terminal electrically connected to said first polarity bus plates and a second polarity bus terminal electrically connected to said second polarity bus plate;
- a plurality of capacitor elements each having a first end surface and a second end surface defining a proximal first polarity terminal proximal to the laminar bus plate arrangement and a distal second polarity terminal distal to the laminar bus plate arrangement, respectively;
- a first number of said capacitor elements being mounted to a first side of said laminar bus plate arrangement such that said first polarity terminals thereof are electrically connected to one of the first polarity bus plates and a second number of said capacitor elements being mounted to a second side of said laminar bus plate arrangement such that said first polarity terminals thereof are electrically connected to another one of said first polarity bus plates; and
- said second polarity terminals of said capacitor elements being electrically connected to said at least one second polarity bus plate.

24. A capacitor assembly as set forth in claim 23,
- wherein said capacitor elements comprise wound film capacitor elements having a generally cylindrical configuration, and
- wherein the capacitor assembly further comprises a respective conductive thru-rod extending along an axis of each of said capacitor elements to provide electrical connection between the second polarity terminal thereof and said at least one second polarity bus plate.

25. A capacitor assembly as set forth in claim 24, further comprising a respective coaxial insulator being located about at least a portion of said conductive thru-rod.

26. A capacitor assembly as set forth in claim 24, wherein said conductive thru-rod extends through an aperture in a corresponding one of said first polarity bus plates for connection to said second polarity bus plate.

27. A capacitor assembly as set forth in claim 23, further comprising a base plate to which said laminar bus plate arrangement is orthogonally mounted.

28. A capacitor assembly as set forth in claim 27, wherein said laminar bus plate arrangement is in thermally conductive but electrically insulative relationship with said base plate.

29. A capacitor assembly as set forth in claim 28, further comprising at least one thermal shield spaced apart from but at least partially surrounding at least some of said capacitor elements, said thermal shield being in thermally conductive relationship with said base plate.

30. A capacitor assembly as set forth in claim 29, wherein said thermal shield has a multi-sided box-like structure.

31. A capacitor assembly as set forth in claim 30, wherein said at least one second polarity bus plate comprises a pair of said second polarity bus plates juxtaposed to and in electrical communication with one another.

32. A capacitor assembly as set forth in claim 23, wherein said first number of said capacitor elements and said second number of said capacitor elements comprise an equal number of said capacitor elements.

33. A capacitor assembly as set forth in claim 23, wherein said laminar bus plate arrangement and said plurality of capacitor elements are at least partially encased in a potting compound.

34. A capacitor assembly comprising:
- a laminar bus plate arrangement having at least one first polarity bus plate and at least one second polarity bus plate separated by a sheet-like insulator;
- at least one pair of bus terminals having a first polarity bus terminal electrically connected to said first polarity bus plate and a second polarity bus terminal electrically connected to said second polarity bus plate;
- a plurality of wound film capacitor elements each having a first end surface and a second end surface defining a proximal first polarity terminal proximal to the laminar bus plate arrangement and a distal second polarity terminal distal to the laminar bus plate arrangement, respectively;
- said first polarity terminal of each of said capacitor elements being electrically connected to the first polarity bus plate; and
- said second polarity terminals of said capacitor elements being electrically connected to said at least one second polarity bus plate,
- wherein the at least one pair of bus terminals is perpendicular to the laminar bus plate arrangement, extends from the laminar bus plate arrangement, and extends between groups of wound film capacitor elements of the plurality of capacitor elements.

35. The capacitor assembly of claim 34, further comprising a base plate in thermally conductive but electrically insulative relationship with the laminar bus plate arrangement.

36. The capacitor assembly of claim 35, wherein the base plate comprises a horizontal portion and a vertical extension, the laminar bus plate arrangement being in thermally conductive but electrically insulative relationship with the vertical extension.

37. The capacitor assembly of claim 34, further comprising a conductive thru-rod providing electrical communication between the second polarity terminal of each respective capacitor element and the second polarity bus plate.

\* \* \* \* \*